United States Patent

Murch et al.

(10) Patent No.: US 9,793,967 B2
(45) Date of Patent: Oct. 17, 2017

(54) WEIGHTED SUM DATA RATE MAXIMIZATION USING LINEAR TRANSCEIVERS IN A FULL-DUPLEX MULTI-USER MIMO SYSTEM

(71) Applicant: The Hong Kong University of Science and Technology, Hong Kong (CN)

(72) Inventors: Ross David Murch, Kowloon (HK); Vincent Kin Nang Lau, New Territories (HK); Shenghong Li, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 0 days.

(21) Appl. No.: 14/549,306

(22) Filed: Nov. 20, 2014

(65) Prior Publication Data

US 2015/0139347 A1 May 21, 2015

Related U.S. Application Data

(60) Provisional application No. 61/963,019, filed on Nov. 21, 2013.

(51) Int. Cl.
*H04B 7/02* (2017.01)
*H04B 7/216* (2006.01)
(Continued)

(52) U.S. Cl.
CPC ......... *H04B 7/0452* (2013.01); *H04B 7/0456* (2013.01)

(58) Field of Classification Search
CPC .. H04B 7/0452; H04B 7/0456; H04B 7/0417; H04B 7/0413; H04B 17/336; H04B 15/00; H04B 17/26; H04B 1/3827; H04B 7/0482
(Continued)

(56) References Cited

U.S. PATENT DOCUMENTS 6,144,652 A * 11/2000 Avidor .................. H01Q 1/246
                                                                370/336
6,597,678 B1 * 7/2003 Kuwahara ............ H01Q 3/2605
                                                                370/335

(Continued)

FOREIGN PATENT DOCUMENTS

CA           2859307 A1    6/2013
CN        103095351 A      5/2013
(Continued)

OTHER PUBLICATIONS

Kramer, et al., "Cooperative strategies and capacity theorems for relay networks," IEEE Trans. Inform. Theory, vol. 51, No. 9, pp. 3037-3063, Sep. 2005. Retrieved on Jan. 11, 2016, 21 pages.

(Continued)

*Primary Examiner* — Daniel Washburn
*Assistant Examiner* — Sarah Hassan
(74) *Attorney, Agent, or Firm* — Amin, Turocy & Watson, LLP

(57) ABSTRACT

Signal interference associated with multi-user multiple-input multiple-output (MIMO) full-duplex wireless communication systems is reduced. In an example, first streams are received by a MIMO base station from uplink user devices based on a first availability of channel matrices and second streams are transmitted to downlink user devices based on a second availability of the channel matrices. A weighted sum of a first data rate for a first linear transceiver matrix and a second data rate of a second linear transceiver matrix is maximized based on the channel matrices, the first streams, and the second streams. The base station generates a first linear transceiver vector used in transmission of the first streams to the base station from the uplink user devices and a second linear transceiver vector used in transmission of the (Continued)

second streams from the base station to the downlink user devices.

20 Claims, 12 Drawing Sheets

(51) Int. Cl.
*H04B 7/0452* (2017.01)
*H04B 7/0456* (2017.01)

(58) Field of Classification Search
USPC .......................................... 375/267; 370/335
See application file for complete search history.

(56) References Cited

U.S. PATENT DOCUMENTS

| | | | | |
|---|---|---|---|---|
| 6,606,058 | B1* | 8/2003 | Bonek | H01Q 3/26 342/367 |
| 6,795,409 | B1* | 9/2004 | Youssefmir | H04B 7/0617 370/277 |
| 6,836,673 | B1* | 12/2004 | Trott | H01Q 3/2611 455/1 |
| 2002/0075967 | A1* | 6/2002 | Voyer | H04B 7/0615 375/267 |
| 2002/0126777 | A1* | 9/2002 | Kasapi | H04B 7/0615 375/346 |
| 2003/0054816 | A1* | 3/2003 | Krebs | H04B 7/18582 455/428 |
| 2003/0190897 | A1* | 10/2003 | Lei | H04B 7/0408 455/101 |
| 2004/0110537 | A1* | 6/2004 | Haardt | H04B 7/0615 455/562.1 |
| 2009/0082027 | A1* | 3/2009 | Yavuz | H04W 72/082 455/446 |
| 2010/0278059 | A1* | 11/2010 | Wu | H04B 7/0413 370/252 |
| 2013/0089009 | A1* | 4/2013 | Li | H04L 27/2601 370/278 |
| 2013/0155912 | A1 | 6/2013 | Khojastepour et al. | |
| 2013/0188530 | A1 | 7/2013 | Pirskanen et al. | |
| 2014/0071994 | A1 | 3/2014 | Sharp et al. | |

FOREIGN PATENT DOCUMENTS

| | | |
|---|---|---|
| WO | 2010107623 A2 | 9/2010 |
| WO | 2012059555 A1 | 5/2012 |
| WO | 2012106263 A1 | 8/2012 |
| WO | 2013088393 A1 | 6/2013 |
| WO | 2013173250 A1 | 11/2013 |

OTHER PUBLICATIONS

Day et al., "Full-duplex bidirectional mimo: Achievable rates under limited dynamic range," IEEE Trans. Proc., vol. 60, No. 7, pp. 3702-3713, Jul. 2012. Retrieved on Jan. 11, 2016, 5 pages.
Day et al., "Full-duplex mimo relaying: Achievable rates under limited dynamic range," IEEE J. Select. Areas Commun., vol. 30, No. 8, pp. 1541-1553, Sep. 2012. Retrieved on Jan. 11, 2016, 5 pages.
Li, et al. "Full-duplex wireless communication using transmitter output based echo cancellation," in Proc. IEEE Global Commun. Conf. (GLOBECOM), Dec. 2011, pp. 1-5.
Chen, et al. "Division-free duplex for wireless applications," Electronics Letters, vol. 34, pp. 147-148, Jan. 1998.
Choi, et al. "Achieving single channel, full duplex wireless communication," in Proc. Annu. Int. Conf. on Mobile Comput. and Netw. (ACM MobiCom), 2010. Retrieved on Jan. 11, 2016, 12 pages.
Duarte, et al., "Full-duplex wireless communications using off-the-shelf radios: Feasibility and first results," in Asilomar Conference on Signals, Systems and Computers (ASILOMAR), Nov. 2010, pp. 1558-1562. Retrieved on Jan. 27, 2016, 5 pages.
Senaratne, et al., "Beamforming for space division duplexing," in Proc. IEEE Int. Conf. on Commun. (ICC), 2011, pp. 1-5.
Riihonen, et al. "Mitigation of loopback self-interference in full-duplex mimo relays," IEEE Trans. Signal Proc., vol. 59, No. 12, pp. 5983-5993, Dec. 2011.
Bliss, et al. "Simultaneous transmission and reception for improved wireless network performance," in Proc. IEEE Workshop Statist. Signal Process., Aug. 2007, 5 pages.
Riihonen, et al., "Spatial loop interference suppression in full-duplex mimo relays," in Proc. Asilomar Conf. Signals Syst. Comput., Nov. 2009, 5 pages.
Larsson, et al., "Mimo on-frequency repeater with self-interference cancellation and mitigation," in Proc. IEEE Veh. Tech. Conf., Apr. 2009, pp. 1-5.
Huang et al., "Rank-constrained separable semidefinite programming with applications to optimal beamforming," IEEE Trans. Signal Proc., vol. 58, No. 2, pp. 664-678, 2010. Retrieved on Jan. 27, 2016, 15 pages.
Luo et al., "Semidefinite relaxation of quadratic optimization problems," Signal Processing Magazine, IEEE, vol. 27, No. 3, pp. 20-34, 2010. Retrieved on Jan. 27, 2016, 14 pages.
Shi et al., "An iteratively weighted mmse approach to distributed sum-utility maximization for a mimo interfering broadcast channel," IEEE Trans. Signal Proc., vol. 59, No. 9, 2011. Retrieved on Jan. 27, 2016, 4 pages.
Tse et al., "Fundamentals of wireless communication". Sep. 10, 2004. Published by the Cambridge University Press, 2005. Retrieved on Feb. 4, 2016, 647 pages.
Luo et al., "Dynamic spectrum management: Complexity and duality," IEEE J. Sel. Topics Signal Process., vol. 2, No. 1, pp. 57-73, 2008. Retrieved on Jan. 17, 2016, 17 pages.
Chiu et al., "Robust transceiver design for k-pairs quasi-static mimo interference channels via semi-definite relaxation," IEEE Trans. Wireless Commun., vol. 9, No. 12, pp. 3762-3769, Dec. 2010. Retrieved on Jan. 17, 2016, 11 pages.
Kim et al., "Optimal resource allocation for mimo ad hoc cognitive radio networks," IEEE Trans. Inform. Theory, vol. 57, No. 5, pp. 3117-3131, 2011. Retrieved on Jan. 17, 2016, 15 pages.
Chiang et al., "Power control by geometric programming," IEEE Trans. Wireless Commun., vol. 6, No. 7, pp. 2640-2651, 2007. Retrieved on Jan. 17, 2016, 12 pages.
Bromberg, Matthew. "Optimizing mimo multipoint wireless networks assuming gaussian other-user interference," IEEE Trans. Inform. Theory, vol. 49, No. 10, pp. 2352-2362, Oct. 2003.
Yoo et al., "On the optimality of multiantenna broadcast scheduling using zero-forcing beamforming," IEEE J. Select. Areas Commun., vol. 24, No. 3, pp. 528-541, Mar. 2006. Retrieved on Jan. 17, 2016, 14 pages.
Razaviyayn et al., "On the degrees of freedom achievable through interference alignment in a mimo interference channel," IEEE Trans. Signal Proc., vol. 60, No. 2, pp. 812-821, 2012. Retrieved on Jan. 17, 2016, 23 pages.
Ruan et al., "Dynamic interference mitigation for generalized partially connected quasi-static mimo interference channel," IEEE Trans. Signal Proc., vol. 59, No. 8, pp. 3788-3798, Aug. 2011. Retrieved on Jan. 17, 2016, 31 pages.
Codreanu, et al., "Joint design of tx-rx beamformers in mimo downlink channel," IEEE Trans. Signal Proc., vol. 55, No. 9, Sep. 2007, 6 pages.
Gomadam et al., "Approaching the capacity of wireless networks through distributed interference alignment," in Proc. IEEE Global Commun. Conf. (GLOBECOM), 2008. Retrieved on Jan. 17, 2016, 10 pages.
Balan, et al. "AirSync: enabling distributed multiuser MIMO with full spatial multiplexing", IEEE/ACM Transactions on Networking, vol. 21 Issue 6, Dec. 2013, pp. 1681-1695.
Vouyoiukas, "A Survey on Beamforming Techniques for Wireless MIMO Relay Networks", International Journal of Antennas and Propagation, vol. 2013, Article ID 745018, Jul. 2013, 21 pages.

(56) References Cited

OTHER PUBLICATIONS

Talwar, et al. "Enabling technologies and architectures for 5G wireless", 2014 IEEE MTT-S International Microwave Symposium (IMS), Jun. 2014, 4 pages.

Choi, et al., "Achieving single channel, full duplex wireless communication", Proceedings of the sixteenth annual international conference on Mobile computing and networking, MobiCom '10, Sep. 2010, 12 pages.

Aryafar, et al. "MIDU: enabling MIMO full duplex", Proceedings of the 18th annual international conference on Mobile computing and networking, Mobicom '12, Aug. 2012, 13 pages.

Gesbert, et al., "Multi-Cell MIMO Cooperative Networks: A New Look at Interference", IEEE Journal on Selected Areas in Communications, vol. 28, No. 9, Dec. 2010, 29 pages.

Taniguchi, et al., "Design and analysis of MIMO multiuser system using full-duplex multiple relay nodes" Wireless Days (WD), 2012 IFIP. IEEE, Nov. 2012, 8 pages.

"Wireless Full Duplex—A Revolution in Wireless Design", Kumu Networks. [http://kumunetworks.com/], retrieved on Feb. 4, 2016, 3 pages.

"A060-Mini—full duplex 60 gHz Backhaul Radio unit", Athena Wireless Communications Inc. [http://www.athenawave.com/products/a060-mini/], archived page dated Sep. 1, 2014 retrieved via the Internet Archive Wayback Machine [https://web.archive.org/web/20140901113322/http://www.athenawave.com/products/a060-mini/], retrieved on Feb. 4, 2016, 3 pages.

"60 GHz Wireless", Bridgewave Communications, [http://www.bridgewave.com/products/60Ghz.cfm], retrieved on Feb. 4, 2016, 2 pages.

"Radio Products", Tranzeo Wireless Technologies Inc., [http://www.tranzeo.com/products/], retrieved on Feb. 4, 2016, 3 pages.

"airFiber24", Ubiquiti Networks, [http://www.ubnt.com/airfiber/airfiber24/], retrieved on Feb. 4, 2016, 6 pages.

"Wireless Ethernet made easy", Sub10 Systems, [http://www.sub10systems.com/products/], archived page dated Aug. 18, 2014 retrieved via the Internet Archive Wayback Machine, [https://web.archive.org/web/20140818102620/http://www.sub10systems.com/products/], retrieved on Feb. 4, 2016, 4 pages.

\* cited by examiner

WEIGHTED SUM DATA RATE MAXIMIZATION USING LINEAR TRANSCEIVERS IN A FULL-DUPLEX MULTI-USER MIMO SYSTEM

RELATED APPLICATION

This patent application claims priority to U.S. Patent Appln. No. 61/963,019, filed Nov. 21, 2013, and entitled "Weighted Sum Rate Maximization Using Linear Transceivers in Full-Duplex Multi-User MIMO System," the entirety of which is hereby incorporated herein by reference in its entirety.

TECHNICAL FIELD

This disclosure relates to increasing a data rate in wireless communication between a base station device, uplink user devices and downlink user devices.

BACKGROUND

In wireless communication networks, the multi-user full-duplex multiple-input multiple-output (MIMO) protocol utilized for transmission and reception of signals transmitted within the same frequency band has received increased recognition as a promising technique to increase network spectral efficiency. A benefit of the multi-user full-duplex MIMO protocol is to facilitate a communication network's ability to receive signals from multiple uplink user devices and send signals to multiple downlink user devices simultaneously. A downside consequence associated with utilizing the full-duplex signal protocol is the creation of self-interference between incoming and outgoing signals (i.e., transmitters and receivers) of a base station, which contaminates the incoming signals and deteriorates the performance of the network.

In addition to interference issues related to transceivers of a base station, the multi-user full-duplex MIMO protocol of communication networks also presents interference issues between mobile devices that send signals (e.g., uplink user devices) to, or receive signals (downlink user devices) from, a base station. Particularly, downlink user devices can suffer from interference caused by the transmission of signals sent by uplink user devices located within a defined communication range of the downlink mobile devices. Given such problems, ambiguity exists around the question of how to fully realize multi-user MIMO full-duplex communication networks.

Currently, there are a few approaches to remedy the self-interference issue, however, each approach falls short of eliminating self-interference. One proposed approach referred to as temporal cancellation includes replicating an interfering signal and subtracting the replicated signal from the received signal at a base station. Another proposed approach implements a 2-stage iterative echo canceller at a receiver of a base station to boost the overall throughput of a received signal. Another approach includes the exploitation of spatial degrees of freedom between antennas that transmit signals (e.g., transceiver of a base station) and antennas that receive signals (e.g., antenna of a mobile station) in order to alter space-time processing of signals in an effort to suppress self-interference of signals in communication networks.

Most of the existing approaches consider the scenario of point-to-point communication (e.g., backhaul link), while the benefits of full-duplex communication in multi-user access network have not been fully exploited. In this regard, there is a significant need for devices, systems and methods to increase the data rate in multi-user networks that utilize a full-duplex MIMO protocol.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with systems, devices, and methods for mitigating signal interference associate with implementing a full-duplex MIMO protocol with multi-user communication networks. In an embodiment, a system is provided comprising a memory that stores executable modules; and a processor, coupled to the memory, that executes the executable modules to perform operations of the apparatus, the executable modules comprising: a selection component, an assignment component, an identification component, a determination component, and a generation component.

In an aspect, a selection component of the system, selects a subset of uplink user devices of a set of uplink user devices and a subset of downlink user devices of a set of downlink user devices. An assignment component assigns a first set of data streams to the subset of uplink user devices and a second set of data streams to the subset of downlink user devices, wherein assignment of the first and second sets of data streams is based on a set of channel matrices comprising channel information representative of a set of uplink channels, a set of downlink channels, a set of cross-user channels, and a set of self-interference channels. Furthermore, an identification component that identifies a first initial linear transceiver based on a first initial linear transceiver matrix, wherein the first initial linear transceiver is used to receive the first set of data streams from the subset of uplink user devices, and a second initial linear transceiver based on a second initial linear transceiver matrix, wherein the second initial linear transceiver is used to transmit the second set of data streams to the subset of downlink user devices, wherein identification of the first and second initial linear transceivers is based on a number of data streams that correspond to the first set of data streams, the second set of data streams and the set of channel matrices.

In another aspect, a determination component determines a transmission scheme that reduces interference between the first set of data streams and the second set of data streams to maximize the weighted sum data rate, wherein the weighted sum data rate corresponds to a potential transmission of data of the first set of data streams and the second set of data streams based on the first initial linear transceiver matrix, the second initial linear transceiver matrix, the number of data streams corresponding to the first set of data streams and the second set of data streams, and the set of channel matrices, wherein the determination component further determines a first definitive linear transceiver vector and a second definitive linear transceiver and wherein the first definitive linear transceiver is capable of receiving the first set of data streams using a first linear transceiver vector from the subset of uplink user devices and the second definitive transceiver is capable of transmitting the second set of data streams using a second linear transceiver vector to the subset of downlink user devices.

In yet another aspect, a generation component generates the first linear transceiver vector configured for use in transmission of the first set of data streams to a base station device and the second linear transceiver vector configured for use in transmission of the second set of data streams from the base station device to the subset of downlink user devices based on a first definitive linear transceiver matrix representing the first linear transceiver vector, a second definitive transceiver matrix representing the second linear transceiver vector, and the set of channel matrices.

In another embodiment, a method is provided comprising receiving, by a base station device comprising a processor, a first set of data streams from a subset of uplink user devices of a set of uplink user devices, wherein the receiving is based on a first availability of a set of channel matrices comprising channel information representing at least one of an uplink channel, a downlink channel, a cross-user channel, or a self-interference channel of the base station device, wherein the base station device is configured to communicate according to a multiple input multiple output (MIMO) protocol. In an aspect, the method comprises transmitting, by the base station device, a second set of data streams to a subset of downlink user devices of a set of downlink user devices, wherein the transmitting is based on a second availability of the set of channel matrices.

Furthermore, the method comprises selecting, by the base station device, a first linear transceiver matrix, based on which the base station device receives a first set of signals from the subset of uplink user devices and a second linear transceiver matrix to transmit a second set of signals from the base station device to the subset of downlink user devices based on a third availability of a data link and the set of channel matrices. The method also comprises, determining, by the base station device, a first data transmission for the set of uplink user devices and a second data transmission for the set of downlink user devices based on the set of channel matrices, the first set of data streams, and the second set of data streams; and generating, by the base station device, a first linear transceiver vector configured for use in transmission of the first set of data streams to the base station device from the subset of uplink user devices and a second linear transceiver vector configured for use in transmission of the second set of data streams from the base station device to the subset of downlink user devices.

The following description and the annexed drawings set forth certain illustrative aspects of the disclosure. These aspects are indicative, however, of but a few of the various ways in which the principles of the disclosure may be employed. Other aspects of the disclosure will become apparent from the following detailed description of the disclosure when considered in conjunction with the drawings.

DETAILED DESCRIPTION

Overview

Figure 1:
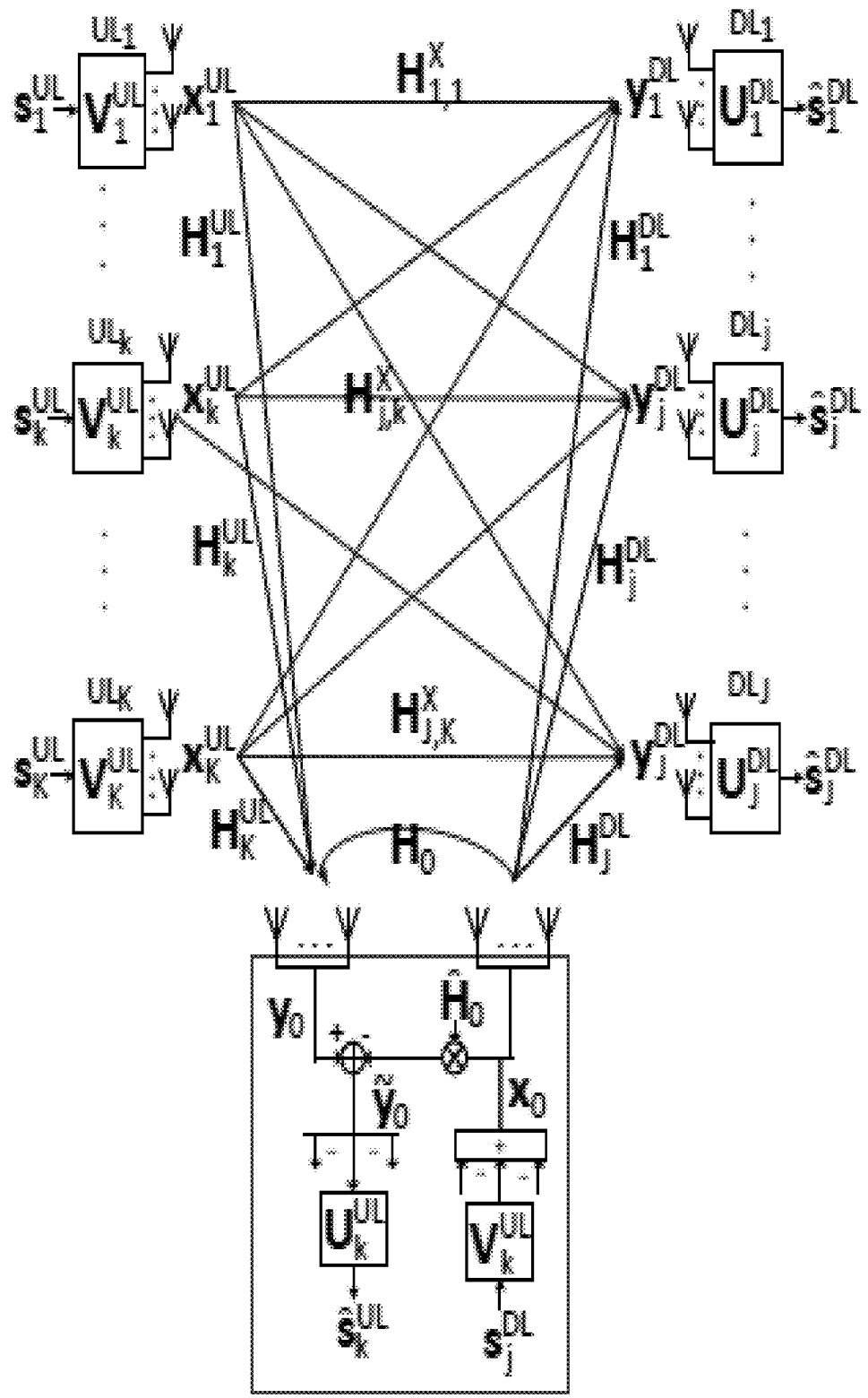
FIG. 1 illustrates a non-limiting multi-user MIMO system where the base station communicates with uplink user devices and downlink user devices simultaneously.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

By way of introduction, this disclosure relates to systems and methods for mitigating complex interference between signals received by and sent from a base station that is a part of a communication network implementing a full-duplex multi-user MIMO protocol. A communication network that implements the full-duplex MIMO protocol utilizes multiple antennas at multiple locations (e.g., at location of a base station device and a mobile station) amongst which, signals travel. By incorporating multiple antennas at multiple locations, the transmitter and receiver corresponding to a signal can communicate data (e.g., via a data stream) associated with the signal at higher data rates as compared to network systems that utilize single antenna protocols.

In a full-duplex multi-user MIMO system, the base station communicates simultaneously with multiple uplink (UL) user devices and multiple downlink (DL) user devices. The incoming signals and outgoing signals associated with the communication between the base station and the UL user devices and DL user devices often interfere with each other, compromising the rate of data transfer of the communication network.

Disclosed herein are systems and methods to mitigate the interference via a precoder and decorrelator scheme for a full-duplex base station, uplink user devices, and downlink user devices. The systems and methods formulate an optimization algorithm that implements a set of rules to achieve a maximum weighted sum rate of signal transmission of a full-duplex multi-user MIMO communication network while mitigating self interference and accounting for maximum power constraints of the communication network. The set of rules also achieves interference mitigation in light of other interference mitigating approaches such as those that utilize manipulations in antenna degrees of freedom (DOF) or approaches that increase the signal to noise ratio of a transmission.

In an aspect, the optimization algorithm maximizes the weighted sum by solving equivalent convex sub-problems using corresponding algorithms. The sub-algorithms are iteratively applied as an overarching optimization algorithm to converge at a stationary point of the original problem (e.g., solving for a maximized weighted sum). The optimization algorithm implements a structure that selects appropriate UL user devices and DL user devices and a strategy to initialize the iterative optimization algorithm. The disclosed design in accordance with the optimization algorithm offers a substantial performance increase in communication transmission (e.g., increase in rate of data transmission).

Example Full-Duplex Multi-User MIMO System

The following notations are adopted throughout this description. Upper case and lower case boldface letters are used to denote vectors and matrices, respectively. The notations $X^T$, $X^H$, $X^\dagger$, rank(X) and Tr(X) represents the transpose, the Hermitian transpose, the pseudoinverse, the rank and the trace of matrix X, respectively. $[X]_{(m,n)}$ denotes the element of X in the m-th row and n-th column, $[X]_{(a:b,c:d)}$ means the a-th row to b-th row and the c-th column to d-th column of matrix X. The notation $C^{M \times N}$ denotes a set of complex matrices with a dimension of M×N. The notations for the complex Gaussian distribution include the mean m and covariance matrix F denoted as CN (m, F). Furthermore, E(·) represents the expectation operator and $I_d$ denotes the identity matrix with a dimension of d.

In an aspect, disclosed herein is a multi-user full-duplex MIMO communication system where a base station of the system communicates with K UL user devices and J DL user devices simultaneously. Illustrated at FIG. 1 is a diagramatic model of a full-duplex MIMO system where the base station (BS) communicates with K UL user devices and J DL user devices simultaneously. In an aspect, the BS is equipped with $M_0$ transmit antennas and $N_0$ receive antennas, while the number of antennas of the k-th UL user device and the j-th DL user device are denoted by $M_k$ and $N_j$, respectively. The number of data streams transmitted from the k-th UL user device (to the j-th DL user device) is denoted by $d_k^{UL}$ and $d_j^{DL}$, respectively. $H_k^{UL} \in C^{N_0 \times M_k}$ and $H_j^{DL} \in C^{N_j \times M_0}$ represent the k-th UL channel and the j-th DL channel, respectively. $H_0 \in C^{N_0 \times M_0}$ is the self-interference channel from the transmitter of BS to the receiver of BS. $H_{j,k}^X \in C^{N_j \times M_k}$ denotes the channel from the k-th UL user device to the j-th DL user device.

The vector of symbols transmitted by the k-th UL user device is denoted as $$s_k^{UL} = \left[s_{k,1}^{UL}, \ldots, s_{k,d_k^{UL}}^{UL}\right]^H.$$

It is assumed that the symbols are independent and identically distributed with unit power, $$\left(\text{i.e., } E\left[s_k^{UL}(s_k^{UL})^H\right] = I_{d_k^{UL}}\right).$$

Similarly, the transmit symbols for the j-th DL user device is denoted by $$s_j^{DL} = \left[s_{j,1}^{DL}, \ldots, s_{j,d_j^{DL}}^{DL}\right]^H, \text{ with } E\left[s_j^{DL}(s_j^{DL})^H\right] = I_{d_j^{DL}}.$$

In another aspect, the precoders for the UL data streams and DL data streams are denoted as $$V_k^{UL} \in C^{M_k \times d_k^{UL}} \text{ and } V_j^{DL} \in C^{M_0 \times d_j^{DL}},$$

respectively, the transmitting signal of the k-th UL user device and that of the BS can be written as:

$$x_k^{UL} = V_k^{UL} s_k^{UL} \quad (1)$$

and $$x_0 = \sum_{j=1}^{J} V_j^{DL} s_j^{DL}, \quad (2)$$

respectively. The signal received by the BS and that received by the j-th DL user device can then be written as:

$$y_0 = \sum_{k=1}^{K} H_k^{UL} x_k^{UL} + H_0 x_0 + n_0 \quad (3)$$

and $$y_j^{DL} = H_j^{DL} x_0 + \sum_{k=1}^{K} H_{j,k}^X x_k^{UL} + n_j^{DL}, \quad (4)$$

respectively, where $n_0$:CN $(0, I_{N_0})$ and $n_j^{DL}$:CN $(0, I_{N_j})$ denote the additive white Gaussian noise (AWGN) received by the BS and by the j-th DL user device, respectively.

As is demonstrated in rule (3), and rule (4), in order to achieve full-duplex multi-user MIMO communication, there are three types of interference that need to be addressed: Self-interference at the BS (2nd term in (3)), UL-DL interference at the DL users devices (2nd term in (4)), and Inter-user/inter-stream interference as in conventional multi-user MIMO systems. In an aspect, disclosed is a communication system designed to join the precoders and decorrelators of the BS and UL/DL user devices to tackle the three types of interference and simultaneously maximize the weighted sum rate of data transmitted between uplink user devices, downlink user devices and the BS.

Throughout the disclosure, the notations are simplified such that the system refers to an interference channel with K+J links. Specifically, $S_{UL} = \{UL_1, \ldots, UL_K\}$ and $S_{DL} = \{DL_1, \ldots, DL_J\}$ represent the set of uplink user devices and downlink user devices respectively. Furthermore, in an aspect, the transmit signal of the i-th link (cf. (1)(2)) is denoted as:

$$x_i = V_i s_i, \forall i \in S, \quad (5)$$

where $S \triangleq S_{UL} \cup S_{DL}$. Note that here $s_{UL_k}$ and $s_k^{UL}$ are used interchangeably with some abuse of notation (similar rules apply to $V_i$, $x_i$ etc.). In an aspect, the received signal of the i-th link (cf. (3)(4)) is then given by:

$$y_i = H_{i,i} V_i s_i + \sum_{j \in S, j \neq i} H_{i,j} V_j s_j + n_i, \quad (6)$$

where $H_{i,j}$ and $n_i$ are defined as below:

$$H_{i,j} = \begin{cases} H_j^{UL} & i \in S_{UL}, j \in S_{UL} \\ H_0 & i \in S_{UL}, j \in S_{DL} \\ H_{i,j}^X & i \in S_{DL}, j \in S_{UL} \\ H_i^{DL} & i \in S_{DL}, j \in S_{DL} \end{cases} \quad (7)$$

$$n_i = \begin{cases} n_0 & i \in S_{UL} \\ n_i & i \in S_{DL} \end{cases}$$

Therefore we can formulate the weighted sum rate maximization problem as follows:

$$(P_1) \max_{V_i} \sum_{i \in S} w_i \log_2 |I + V_i^H H_{i,i}^H R_i^{-1} H_{i,i} V_i| \quad (8)$$

$$\text{s.t. } Tr[V_i V_i^H] \le P_i \forall i \in S_{UL} \quad (9)$$

$$\sum_{i \in S_{DL}} Tr[V_i V_i^H] \le P_0 \quad (10)$$

where (9) and (10) are the total power constraints for UL user devices and the BS, respectively. In an aspect, $R_i$ is the covariance matrix of interference plus noise defined as:

$$R_i = \Sigma_{j \ne i} H_{i,j} V_j V_j^H H_{i,j}^H + I. \quad (11)$$

The above formulation of $(P_1)$ is identical to that of an interference channel. Therefore $V_i$ can be designed using similar approaches as those used to formulate an interference channel. However, as can be seen from formula's (3), (4), and (7); $(P_1)$ differs from normal interference channels in that a large part of $H_{i,j}$ overlap. In addition, the magnitude of self-interference channel ($H_0$) is much higher than those of other channels. These features need to be considered in the design for better performance. Disclosed is a solution for $(P_1)$ and further described is an algorithm to select uplink user devices, downlink user devices, and a strategy to choose appropriate initial points.

In an aspect, further disclosed is the design for a joint precoder (e.g., component of a wireless system capable of emitting multiple data streams from an antenna) and decorrelator (e.g., component that reduces interference due to autocorrelation within a signal) to mitigate self-interference without compromising an efficacious rate of data transmission as well as rules, formulas and algorithms in accordance with the design. First $(P_1)$ is transformed into an equivalent weighted sum-mean square error (MSE) minimization problem:

$$(P_2) \min_{V_i, W_i, U_i} \sum_{i \in S} w_i [tr(W_i E_i) - \log\det(W_i)] \quad (12)$$

$$\text{s.t. } Tr(V_i V_i^H) \le P_i \forall i \in S_{UL} \quad (13)$$

$$\sum_{i \in S_{DL}} Tr(V_i V_i^H) \le P_0 \quad (14)$$

where $U_i$ is the linear receive beamformer of the i-th link (e.g., $\hat{s}_i = U_i^H y_i$), $W_i$ is a weight matrix, $E_i$ is the MSE matrix of the i-th link defined as:

$$E_i \stackrel{\Delta}{=} E[(\hat{s}_i - s_i)(\hat{s}_i - s_i)^H] \quad (15)$$
$$= (I - U_i^H H_{i,i} V_i)(I - U_i^H H_{i,i} V_i)^H + U_i^H R_i U_i$$

with $R_i$ defined as in (11).

With the introduction of two auxiliary variables $U_i$ and $W_i$, $(P_2)$ becomes a convex function of each variable when the other two are fixed. Therefore a coordinated descend method can be used to update $U_i$, $V_i$, and $W_i$ iteratively as follows.

When $V_i$, and $W_i$ are fixed, the optimal $U_i$ is given by the minimum mean square estimation (MMSE) receiver:

$$U_i = F_i^{-1} H_{i,i} V_i \quad (16)$$

where $F_i$ is defined as $F_i = \Sigma_{j \in S} H_{i,j} V_j V_j^H H_{i,j}^H + I$.

When $U_i$ and $V_i$ are fixed, by taking the derivative of (12) and setting it to zero, we can obtain the optimal $W_i$ as $$W_i = E_i^{-1} \quad (17)$$

where $E_i$ is given by (15).

With fixed $U_i$ and $W_i$, $(P_1)$ is a convex quadratic problem of $V_i$. In an aspect, a close form solution of $V_i$ as follows $$V_i = (\Sigma_{j \in S} w_j H_{j,i}^H U_j W_j U_j^H H_{j,i} + \mu_i I)^{-1} w_i H_{i,i}^H U_i W_i, \quad (18)$$

$\mu_i$ in (18) can be calculated with a bisection method according to the following power constraint:

$$\sum_{m=1}^{M_i} \frac{[F_i]_{(m,m)}}{([L_i]_{(m,m)} + \mu_i)^2} = P_i \quad (19)$$

where $[X]_{(m,n)}$ denotes the (m,n)-th element of X, $F_i$ is defined as $$F_i = \begin{cases} D_i^H (H_{i,i}^H U_i w_i^2 W_i^2 U_i^H H_{i,i}) D_i \forall i \in S_{UL} \\ D_i^H \left( \sum_{j \in S_{DL}} H_{j,i}^H U_j w_j^2 W_j^2 U_j^H H_{j,i} \right) D_i \forall i \in S_{DL} \end{cases}$$

and $D_i L_i D_i^H$ is the eigen-decomposition of $\Sigma_{j \in S} H_{j,i}^H U_j w_j W_j U_j^H H_{j,i}$.

Therefore, $(P_1)$ can be solved iteratively using the weighted sum rate maximization (WSRM) algorithm below, which will converge to a stationary point of $(P_1)$ as has been proven. Overall, in an aspect, the WSRM algorithm utilizes 1-5 listed below.

1. Initialize $V_i$, $U_i$ so that $Tr(V_i V_i^H) \le P_k \forall k \in S_{UL}$, and $\Sigma_{i \in S_{DL}} Tr(V_i V_i^H) \le P_0$
2. Update the weight matrices $W_i$ according to (17)
3. Update the precoders $V_i$ using (18)
4. Update the decoders $U_i$ using (16)
5. Repeat Step 2-4 until convergence.

Figure 2A:
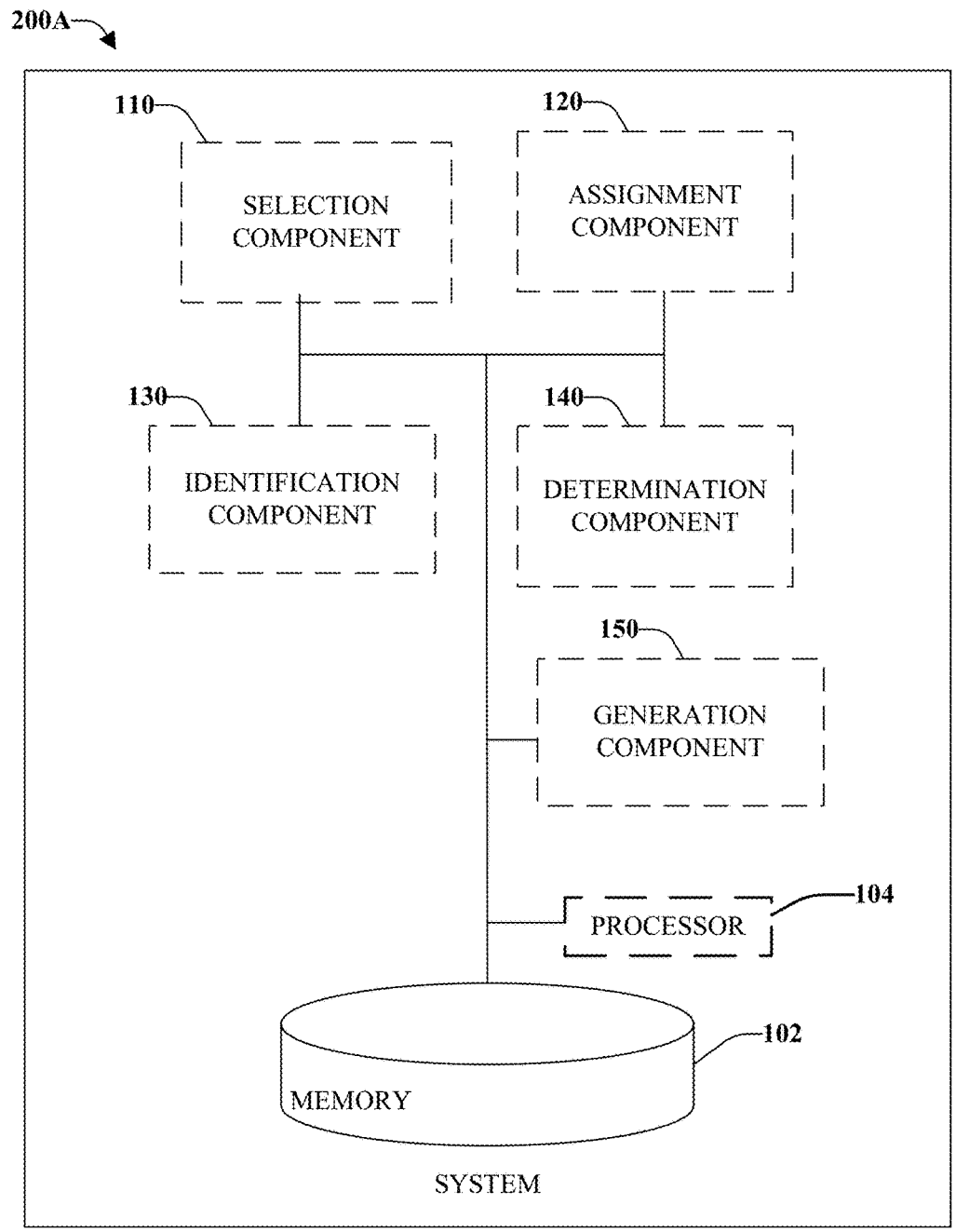
FIG. 2A illustrates a non-limiting example of a system for mitigating signal interference of a full-duplex MIMO communication network.

Turning now to FIG. 2(A), illustrated is a non-limiting embodiment of system 200A that mitigates an interference signal and maximizes a weighted sum rate of data transmitted via a multi-user full-duplex MIMO communication network. In an embodiment, system 200A comprises: a memory 102 that stores executable modules; and a processor 104, coupled to the memory 102, that executes the executable modules to perform operations of the apparatus, the executable modules comprising: a selection component 110, an assignment component 120, an identification component 130, a determination component 140, and a generation component 150. In an aspect, the selection component 110 selects a subset of uplink user devices of a set of uplink user devices and a subset of downlink user devices of a set of downlink user devices. Presented are algorithms (e.g., stream selection algorithm) that facilitate the selection of uplink user devices and downlink user devices from a set of downlink user devices and uplink user devices. In an aspect, selection component 110 selects (e.g., based on disclosed algorithms) particular user devices capable of generating a higher weighted sum rate of data transmission. Accordingly, in an aspect, the selection component 110 can select a subset of uplink user devices and the subset of downlink user devices based on a potential for low inter-user stream interference, low uplink and downlink signal interference, no self-interference, and high channel gain.

In another aspect, system 200A employs an assignment component 120 that assigns a first set of data streams to the subset of uplink user devices and a second set of data streams to the subset of downlink user devices, wherein assignment of the first and second sets of data streams is based on a set of channel matrices comprising channel information representative of a set of uplink channels, a set of downlink channels, a set of cross-user channels, and a set of self-interference channels. In an aspect, the assignment component 120 assigns a number of data streams to each uplink user device and each downlink user device based on algorithms (described below) representative of uplink channels, downlink channels, cross-user channels, and self-interference channels. By facilitating simultaneous transmission and reception of data corresponding to respective data streams in the same frequency band and time slot, a channel can be utilized more efficiently to achieve a higher rate of data transmission. Furthermore, by organizing the transmission of data streams (e.g. using assignment component 120), system 200A can mitigate interference between transmitted data streams of uplink channels and downlink channels.

Also, in an aspect, an identification component 130 identifies a first initial linear transceiver based on a first initial linear transceiver matrix, wherein the first initial linear transceiver is used to receive the first set of data streams from the subset of uplink user devices, and a second initial linear transceiver based on a second initial linear transceiver matrix, wherein the second linear transceiver is used to transmit the second set of data streams to the subset of downlink user devices, wherein identification of the first and second initial linear transceivers is based on a number of data streams that correspond to the first set of data streams, the second set of data streams and the set of channel matrices. In an aspect, the identification component 130 in connection with assignment component 120 can identify initial transceivers to both transmit (e.g., from downlink user devices) and receive (e.g., from uplink user devices) data streams (e.g., assigned data streams). The identification of initial linear transmitters is based on algorithms (described below) that take into account the number of data streams that correspond to uplink user devices and downlink user devices as well as channel data corresponding to uplink channels, downlink channels, cross-user channels, and self-interference channels. In an aspect, system 200A can apply the information corresponding to the identified initial linear transmitters to the algorithm that determines a maximum weighted sum of data transmission between the base station and user devices. Furthermore, the algorithm that determines the maximum weighted sum of data can be applied iteratively, each time updating information such as weight matrices, precoder information, and decoder information, ultimately converging at an optimal weighted sum of data.

Furthermore, in another aspect, system 200A employs determination component 140 that determines a weighted sum data rate transmission that reduces interference between the first set of data streams and the second set of data streams according to a defined function, wherein the weighted sum data rate corresponds to a potential transmission of data of the first set of data streams and the second set of data streams based on the first initial linear transceiver matrix, the second initial linear transceiver matrix, the number of data streams corresponding to the first set of data streams and the second set of data streams, and the set of channel matrices, wherein the determination component further determines a first definitive linear transceiver vector and a second definitive linear transceiver to maximize the weighted sum data rate, and wherein the first definitive linear transceiver is capable of receiving the first set of data streams using a first definitive linear transceiver vector from the subset of uplink user devices and the second definitive linear transceiver is capable of transmitting the second set of data streams using a second linear transceiver vector to the subset of downlink user devices.

In an aspect, determination component 140 can apply the iterative algorithm to arrive at a maximum weighted sum of data. The corresponding linear transceiver vectors can be determined (e.g., using determination component 140 which can apply an iterative formula described below) give a set of data streams based on the initial linear transceiver and corresponding transceiver information. Upon arriving at a maximum weighted sum of data solution, the determination component 140 can determine the definitive linear transceivers (rather than initial linear transceivers) capable of receiving and sending data via data streams. Accordingly, determination component 140 can determine linear transceiver vectors for use by the linear transceivers in receiving and sending data.

In another aspect, system 200A employs a generation component 150 that generates the first linear transceiver vector configured for use in transmission of the first set of data streams to a base station device and the second linear transceiver vector configured for use in transmission of the second set of data streams from the base station device to the subset of downlink user devices based on a first definitive linear transceiver matrix representing the first linear transceiver vector, a second definitive linear transceiver matrix representing the second linear transceiver vector, and the set of channel matrices. In an aspect, generation component 150 can construct linear transmitter vectors corresponding to data streams sent from uplink user devices (e.g., uplink user devices selected by selection component 110) to be received linear transmitter vectors corresponding to data streams sent from the base station to downlink user devices (e.g., downlink user devices selected by selection component 110) in accordance with the determined (e.g., using determination component 140) weighted sum of data.

Furthermore, in accordance with selection component 110, system 200A can select (e.g., using a selection component 110) a subset of uplink user devices of a set of uplink user devices and a subset of downlink user devices of a set of downlink user devices. The selection component 110 can employ a selection algorithm to be implemented by a full-duplex multi-user MIMO system. The employment of the selection algorithm can be followed by a selection of an initial point for implementation into the WSRM algorithm. In order to achieve selection of user devices for the full-duplex multi-user MIMO system suppose there are κ mobile station (MS) users (e.g., a set of mobile users using the set of uplink user devices and the set of downlink user devices) in the system, the purpose of user selection is to choose K UL user devices and J DL user devices that can potentially generate higher weighted sum rate.

First, a design is included where $G_0^{Rx}$ and $G_0^{Tx}$, a transmit filter and receiver filter for the BS satisfies $(G_0^{Rx})^H H_0 G_0^{Tx}=0$. Suppose rank $(H_0)=R_0$, by applying singular value decomposition to $H_0$, the following is achieved; $H_0=USV^H=[U_{(a)}U_{(b)}]S[V_{(a)}V_{(b)}]^H$, where $U_{(a)} \in C^{N_0 \times R_0}$, $V_{(a)} \in C^{M_0 \times R_0}$, S is a diagonal matrix with non-zero values on the first $R_0$ diagonal elements. By defining $R=\{1, \ldots, R_0\}$ and $I \subseteq R$ with rank$(I)=\eta$, we have $[U_{(a)}]_{(1:N_0,i)}^H H_0 [V_{(a)}]_{(1:M_0,j)}=0$, $\forall i \in I, j \in R \backslash I$, where $[X]_{(a:b,c:d)}$ means the a-th row to b-th row and the c-th column to d-th column of X. In addition, since $U_{(b)}^H H_0=0$ and $H_0 V_{(b)}=0$, we can construct $G_0^{Rx}$ and $G_0^{Tx}$ as follows:

$$G_0^{Rx}=[\cup_{i \in I}[U_{(a)}]_{(1:N_0,i)} U_{(b)}] \qquad (20)$$

$$G_0^{Tx}=[\cup_{i \in R \backslash I}[V_{(a)}]_{(1:M_0,i)} V_{(b)}] \qquad (21)$$

where ∪ denotes horizontal concatenation of vectors/matrices.

Using $G_0^{Rx}$ and $G_0^{Tx}$ as the receive and transmit filter, respectively, for the BS. In an aspect, the system 200A can be transformed into an equivalent system where the BS has $N_0-R_0+\eta$ Rx antennas and $M_0-\eta$ Tx antennas, which do not generate self-interference. The effective UL/DL channels for each MS after considering the effects of $G_0^{Rx}$ and $G_0^{Tx}$ is then given by $$\overline{H}_k^{UL}=(G_0^{Rx})^H H_k^{UL}$$

$$\overline{H}_k^{DL}=H_k^{DL} G_0^{Tx} \quad (22)$$

Note that $\overline{H}_k^{UL}$ and $\overline{H}_k^{DL}$ denote the channel response for the k-th user device if it works in UL or DL mode, respectively.

Next, each MS user is converted into multiple single antenna users by using the singular vectors of corresponding channels as precoders/decoders. In particular, we denote the singular value decomposition of $\overline{H}_k^{UL}$ and $\overline{H}_j^{DL}$ as $\overline{H}_k^{UL}=E_k^{UL}L_k^{UL}(F_k^{UL})^H$ and $\overline{H}_k^{DL}=E_k^{DL}L_k^{DL}(F_k^{DL})^H$, respectively. If user device k works in the UL mode, the transmit data streams will be precoded with each column of $F_k^{UL}$, e.g., $v_{k,m}^{UL}=[F_k^{UL}]_{(1:M_k,m)}$, $m\in\{1,\ldots,M_k\}$, where $M_k$ is the number of transmit antennas for user device k. Then user k can be treated as $M_k$ single antenna user devices $k_1, \ldots, k_{M_k}$, with channel vectors $h_{k,m}^{UL}$ to each column of $E_k^{UL}L_k^{UL}$. On the other hand, the columns of $E_k^{UL}$ are used as decoders if user device k works in the DL mode, e.g., $u_{k,m}^{DL}=[E_k^{DL}]_{(1:N_k,m)}$, $m\in\{1,\ldots,N_k\}$, where $N_k$ is the number of receive antennas for user device k. The corresponding channel vectors $h_{k,m}^{DL}$ are the rows of $L_k^{DL}(F_k^{DL})^H$ in this case. Accordingly, the interference channel between the m-th stream of UL user k and the n-th stream of DL user j can be denoted by $\chi_{j,n}^{k,m}=(u_{j,n}^{DL})^H H_{j,k}^X v_{k,m}^{UL}$, k, j∈{1, ..., κ}, k≠j. The procedure of user/stream selection is described in the following user stream selection algorithm (Steps 1-5):

1. Initialize the candidate set of UL streams/DL streams as $T_{UL}=\{\{k_m\}_{m=1}^{M_k}\}_{k=1}^{\kappa}$ and $T_{DL}=\{\{k_m\}_{m=1}^{N_k}\}_{k=1}^{\kappa}$, respectively. The set of selected UL/DL streams are initialized to $K_{UL}=K_{DL}=\emptyset$.

2. Select one DL data stream as follows:
  (a) For each $k_m \in T_{DL}$, calculate the component of $h_{k,m}^{DL}$ orthogonal to $\{g_{j,n}^{DL}\}_{j_n \in K_{DL}}$ as follows:

$$g_{k,m}^{DL} = h_{k,m}^{DL} - \sum_{j_n \in K_{DL}} \frac{h_{k,m}^{DL}(g_{j,n}^{DL})^H}{\|g_{j,n}^{DL}\|^2} g_{j,n}^{DL}. \quad (23)$$

Calculate the total power of interference it receives from the selected UL streams using $\beta_{k,m}=\sum_{j_n \in K_{UL}} |\chi_{k,m}^{j,n}|^2 P_{j,n}$, where $P_{j,n}=P_k/d_k^{UL}$, $d_k^{UL}=|\{m|k_m \in K_{UL}\}|$.
  (b) Select the new DL stream $j_n$ according to $$j_n = \arg\max_{k_m \in T_{DL}} w_k \|g_{k,m}^{DL}\|^2 / \beta_{k,m}.$$

(c) Update the related sets: $K_{DL}=K_{DL} \cup j_n$; $T_{DL}=T_{DL}\backslash j_n$; and $T_{UL}=T_{UL}\backslash j_m$, $\forall m\in\{1,\ldots,M_j\}$.

3. Select one UL data stream using a similar approach as in step 2, with $\beta_{k,m}$ defined as $\beta_{k,m}=\sum_{j_n \in K_{DL}} |\chi_{j,n}^{k,m}|^2$, e.g., the total level of interference it will generate to the DL streams that have already been selected.

4. Repeat steps 2 and 3 until $|K_{UL}|=N_0-R_0+\eta$ and $|K_{DL}|=M_0-\eta$.

5. The set of selected UL/DL users are then given by $\{k|\exists m,k_m \in K_{UL}\}$ and $\{k|\exists m,k_m \in K_{DL}\}$, respectively. The number of data streams for each user are $d_k^{UL}=|\{m|k_m \in K_{UL}\}|$ and $d_j^{DL}=|\{m|j_m \in K_{DL}\}|$.

Regarding the WSRM algorithm described above, global convergence of the formula is not guaranteed, thus it is necessary to choose an appropriate initial point to evaluate the system performance via the WSRM algorithm. In particular, the self-interference and UL-DL interference need to be taken into consideration as described above. In this work, we propose to initialize the WSRM algorithm as described in the following initialization algorithm which also serves as the overall algorithm for system 200A.

In an aspect, step 1 of the intialitization algorithm confines the transmit and receive signal of the BS to the subspace spanned by $G_0^{Tx}$ and $G_0^{Rx}$ to eliminate the self-interference. Given the UL and DL user device chosen in step 2, step 3, step 4, and step 5 of the initalization algorithm, which provide an initial point that generates no UL-DL interference. Note that the adjustment of $d_k^{UL}$ and $d_j^{DL}$ in step 3 is introduced to ensure the feasibility of UL-DL interference suppression, such that higher DOF can be achieved when UL-DL interference causes a more stringent limit on the achievable degrees of freedom (DOF) between antennas. The initialization formula, is as follows:

1. Let $\eta=0$, design $G_0^{Rx}$ and $G_0^{Tx}$ using (20) and (21).
2. Use the user stream selection algorithm to choose K UL users and J DL users, with the number of data streams assigned to each user given by $d_k^{UL}$ and $d_j^{DL}$.
3. Using the adjustment algorithm (described below), that adjusts $d_k^{UL}$ and $d_j^{DL}$ so that there exists $V_k^{UL}$ and $U_j^{DL}$ that satisfies:

$$(U_j^{DL})^H H_{j,k}^X V_k^{DL}=0 \quad (24)$$

and $\sum_{k=1}^{K} d_k^{UL} + \sum_{j=1}^{J} d_j^{DL}$ is maximized, where $V_k^{UL}$ and $U_k^{DL}$ denote the precoder for the k-th UL user device and the decoder for the j-th DL user device, respectively.

4. Design the DL precoders $V_j^{DL}$ using zero-forcing scheme: Define $X=[(U_1^{DL})^H \overline{H}_1^{DL}; \ldots; (U_J^{DL})^H \overline{H}_J^{DL}]$, with $\overline{H}_j^{DL}$ defined in (22). Then $V_j^{DL}$ are chosen to be the corresponding columns of the pseudoinverse of X, pre-multiplied by $G_0^{Tx}$ e.g., $[V_1^{DL}, \ldots, V_J^{DL}]=G_0^{Tx}X^{\dagger}$.

5. Normalize $V_k^{UL}$ and $V_j^{DL}$ so that the power allocated to UL and DL streams are $P_k/d_k^{UL}$ and $P_0/\sum_{j=1}^{J} d_j^{DL}$, respectively.

6. Solve the WSRM algorithm using $V_k^{UL}$ and $V_j^{DL}$ as an initial point.

7. Repeat step 1 to step 7 for $\eta=\{0, 1, \ldots, R_0\}$ and pick the solution that renders the highest weighted sum rate.

In an aspect, the results of a full-duplex multi-user MIMO system that employs the described system 200A and corresponding algorithms has been investigated through computer simulation. The simulation assumes that there are κ MSs uniformly distributed within a circle which is centered at the BS with a radius of 10 miles. The channels are modeled as the summation of multiples scattering paths, with the average channel gain given by $\sqrt{1/d^\alpha}$, where d denotes the distance between the corresponding transmitter and receiver, and $\alpha=2$ is the path loss factor. The transmitter and receiver of the BS are assumed to be separated by 0.1 mile. The performance of the following baseline schemes are also presented for comparison via the simulation: Baseline 1: (Half-Duplex DL) Downlink multi-user MIMO system with $M_0$ Tx antennas and κ users; Baseline 2: (Half-Duplex UL) Uplink multi-user MIMO system with $N_0$ Rx antennas and κ users; and Baseline 3: (Full-Duplex User Selection) where the WSRM algorithm is used to choose UL/DL users, with the UL precoders and DL decoders given by channel singular vectors. The DL precoders are computed using Step 4-5 of the initialization algorithm.

Figure 2B:
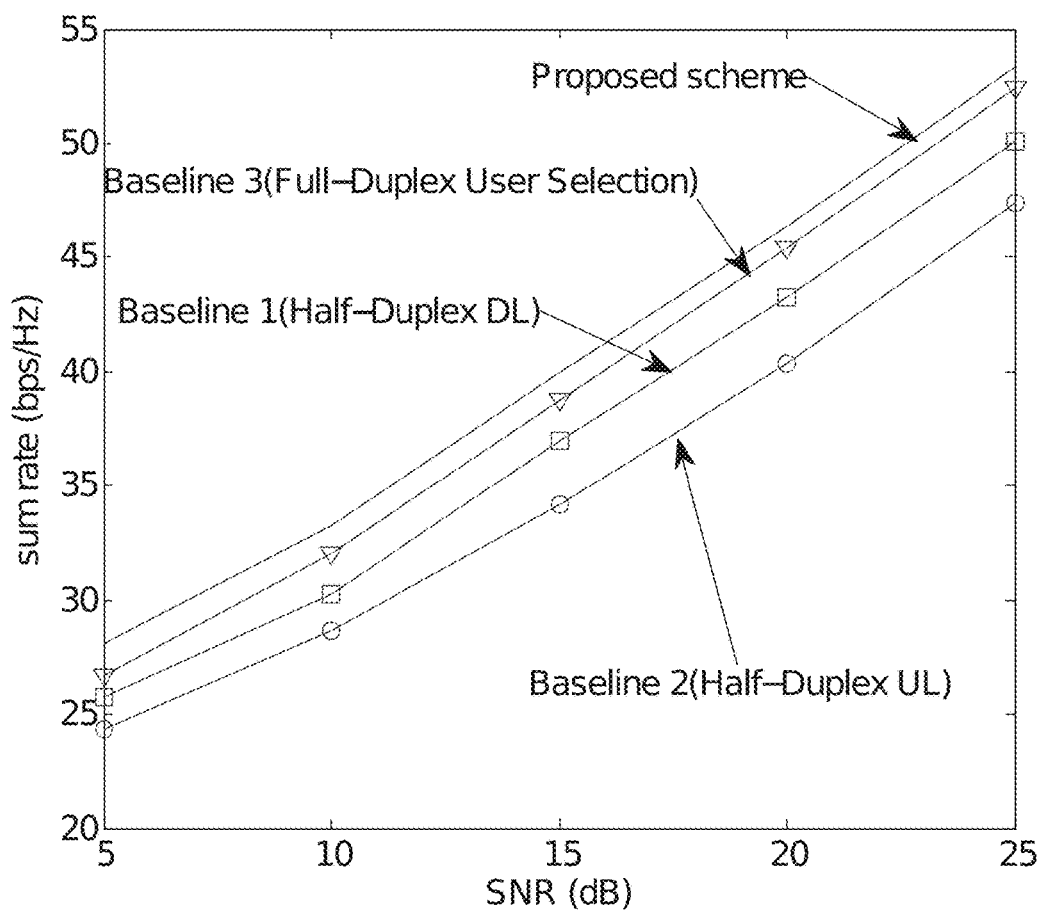
FIG. 2B provides a chart that presents the total data rate of a full-duplex MIMO system employing a system to mitigate self-interference as compared to baseline schemes.

Considered first is a scenario depicting κ=8 user devices. The BS has 4 Tx (outgoing transmission) antennas and 4 Rx (receiver) antennas, while each MS is equipped with 3 antennas. The rank of $H_k^{UL}$, $H_j^{DL}$, $H_0$ and $H_{j,k}^X$ are 3, 3, 4, and 3, respectively, i.e., all the channels are full-rank. The maximum transmit power of BS ($P_0$) is 4 times that of the MS ($P_k$). Illustrated at FIG. 2(B) is chart 200B that shows the relationship between the total data rate and the transmit signal to noise ratio (SNR), which is defined as the ratio between $P_k$ and the noise power. The weights $w_i$ are set equally for all users.

It can be seen that the proposed full-duplex system outperforms the baseline schemes. In particular, the data rate achieved by the full-duplex system is more than 10 percent higher than that achieved by a half-duplex uplink system when the transmit SINR is 25 dB. This improvement in data rate is derived from the following two factors: 1) depending on the channel, a MS may be selected to work in UL or DL mode in full-duplex MU-MIMO systems, leading to a diversity gain; and 2) a full-duplex multi-user MIMO system enjoys a power gain (over a half-duplex uplink system) by allowing the BS and UL MSs to transmit at the same time.

Since $H_0$ is full rank for the results shown in chart 200B of FIG. 2(B), the number of DOFs achieved by the full-duplex system is the same as those achieved by the half-duplex schemes (i.e., 4). However, $H_0$ is usually rank-deficient due to antenna correlation or the lack of scattering, which allows the proposed full-duplex configuration to accommodate more data streams. In an aspect, chart 200C plots the results given the rank of ($H_0$)=2. In an aspect, chart 200C compares various systems to the currently described full-duplex system that employs the WSRM algorithm. As illustrated in chart 200C for the current scenario, the total data rate achieved by the full-duplex system is significantly higher than those achieved by the baseline schemes. In addition, the algorithm achieves a DOF of 6, which is higher than the 4 DOFs achieved by the baseline schemes. On the other hand, the full-duplex scheme based on pure user-selection achieves 4 DOFs because the UL-DL interference is not taken into consideration.

Figure 2C:
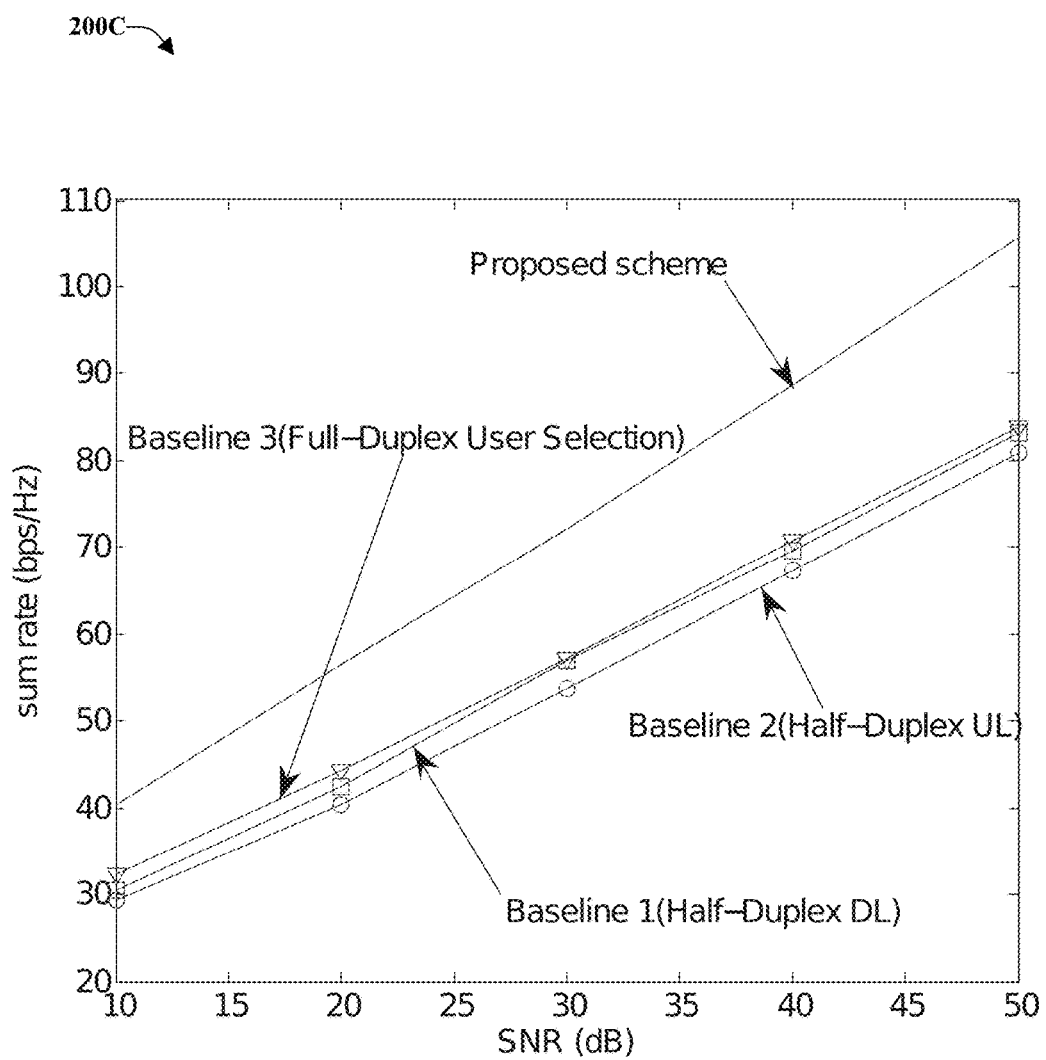
FIG. 2C provides a chart that compares the total data rate of a full-duplex MIMO system employing a system to mitigate self-interference to half-duplex schemes.

Thus the results consider a full-duplex multi-user MIMO system with the BS transmitting and receiving simultaneously to (and from) multiple DL (UL) MSs. The challenges of such system lies in the self-interference of the BS and the interference caused by the UL user devices to the DL user devices. The joint design of the precoders/decoders of the system to suppress the interference and maximize the weighted sum rate is described above. Also described above is an iterative algorithm based on minimizing the weighted sum MSE, which converges to a stationary point of the optimization problem. In another aspect, described above is a user selection algorithm to choose appropriate UL/DL user devices as well as an approach for choosing initial points. Furthermore, in an aspect, the simulation results (e.g., illustrated at FIG. 2B and FIG. 2C) illustrate that the system 200A outperforms conventional half-duplex systems in terms of total data rate. In addition, higher DOF can be achieved when the self-interference channel is rank deficient.

In accordance with assignment component 120 described above, the assignment component can assign the first set of data streams to the subset of uplink user devices and the second set of data streams to the subset of downlink user devices based on a defined set of transmission rules. Accordingly, a transmission rule can include adjusting variables (e.g. using optimization component 310, described below) related to the precoder, decoder, downlink data streams, and uplink data streams. In an aspect, by adjusting such variables the WSRM algorithmic result can be manipulated as well as features of system 200A. For instance, by adjusting information related to the uplink data streams and downlink data streams, assignment component 120 may provide different assignment directives.

In an aspect, a defined transmission rule can include an algorithm for adjusting uplink data streams and downlink data streams. In an aspect, the algorithm denotes, $v_k^{UL}$ and $v_j^{DL}$ as the number of free variables in the precoder $V_k^{UL}$ and decoder $U_j^{DL}$, respectively, e.g., $v_k^{UL}=d_k^{UL}(M_k-d_k^{UL})$, $v_j^{DL}=d_j^{DL}(N_j-d_j^{DL})$. Furthermore, the number of constraints required to suppress the interference from the k-th UL user device to the j-th DL user device is denoted as $c_{k,j}=d_k^{UL}d_j^{DL}$. Define $p_k^{UL}=\Sigma_j c_{k,j}-v_k^{UL}-[\Sigma_j c'_{k,j}-v'_k^{UL}]$, where $c'_{k,j}$ and $v'_k^{UL}$ are defined similarly as $c_{k,j}$ and $v_k^{UL}$, respectively, with $d_k^{UL}$ replaced with $d'_k^{UL}=d_k^{UL}-1$. Therefore $p_k^{UL}$ represents the change in the difference between the number of constraints and that of the free variables if $d_k^{UL}$ is decreased by 1. Similarly, $p_j^{DL}=\Sigma_k c_{k,j}-v_j^{DL}-[\Sigma_k c'_{k,j}-v'_j^{DL}]$ can be defined as well. In addition, we can define $q_k^{UL}$ and $q_j^{DL}$ similarly as such changes when $d_k^{UL}$ and $d_j^{DL}$ is increased by 1, respectively. Then $d_k^{UL}$ and $d_j^{DL}$ are adjusted as follows (note that (24) is similar to the constraints described below with respect to an interference alignment algorithm, which can be used to check the feasibility of the adjustment algorithm and find the corresponding $V_k^{UL}$ and $U_j^{DL}$):

1. Given $d_k^{UL}$, $d_j^{DL}$, $H_{j,k}^X$, check the feasibility of (24). Go to step 2 if it is feasible and step 3 if otherwise.
2. Select k' and j' according to $$k' = \underset{k}{\operatorname{argmax}}\, p_k^{UL}$$

and $$j' = \underset{j}{\operatorname{argmax}}\, p_j^{DL}.$$

If $p_{k'}^{UL}>p_{j'}^{DL}$, set $d_{k'}^{UL}=d_{k'}^{UL}-1$; otherwise set $d_{j'}^{DL}=d_{j'}^{DL}-1$. Then go to step 1.

3. Select k' and j' according to $$k' = \underset{k}{\operatorname{argmax}}\, q_k^{UL} \text{ and } j' = \underset{j}{\operatorname{argmax}}\, q_j^{DL}.$$

If $q_{k'}^{UL}>q_{j'}^{DL}$, set $d_{k'}^{UL}=d_{k'}^{UL}+1$; otherwise set $d_{j'}^{DL}=d_{j'}^{DL}+1$.

4. Check the feasibility of (24). Go to step 3 if it is feasible; otherwise restore the change made to $d_k^{UL}$ or $d_j^{DL}$ in step 3 and exit.

In another aspect, another transmission rule can include an algorithm to mitigate the interference imposed on DL data streams by the UL data streams as follows:

1. Initialize each $V_k^{UL}$ so that $(V_k^{UL})^H V_k^{UL}=I$.
2. Calculate the interference covariance matrix at each of the DL user devices:

$$Q_j = \Sigma_{k=1}^K H_{j,k}^X V_k^{UL}(V_k^{UL})^H (H_{j,k}^X)^H$$

Update $U_j^{DL}$ with the aggregation of the eigenvectors of $Q_j$ corresponding to the $d_j^{DL}$ smallest eigenvalues.

3. Calculate the equivalent interference covariance matrix at the UL user devices when the channel is reversed:

$$Q'_k = \Sigma_{j=1}^J (H_{j,k}^X)^H U_j^{DL} (U_j^{DL})^H H_{j,k}^X$$

Update $V_k^{UL}$ with the aggregation of the eigenvectors of $Q'_k$ corresponding to the $d_k^{UL}$ smallest eigenvalues.

4. Repeat steps 2-3 until convergence.

Figure 3:
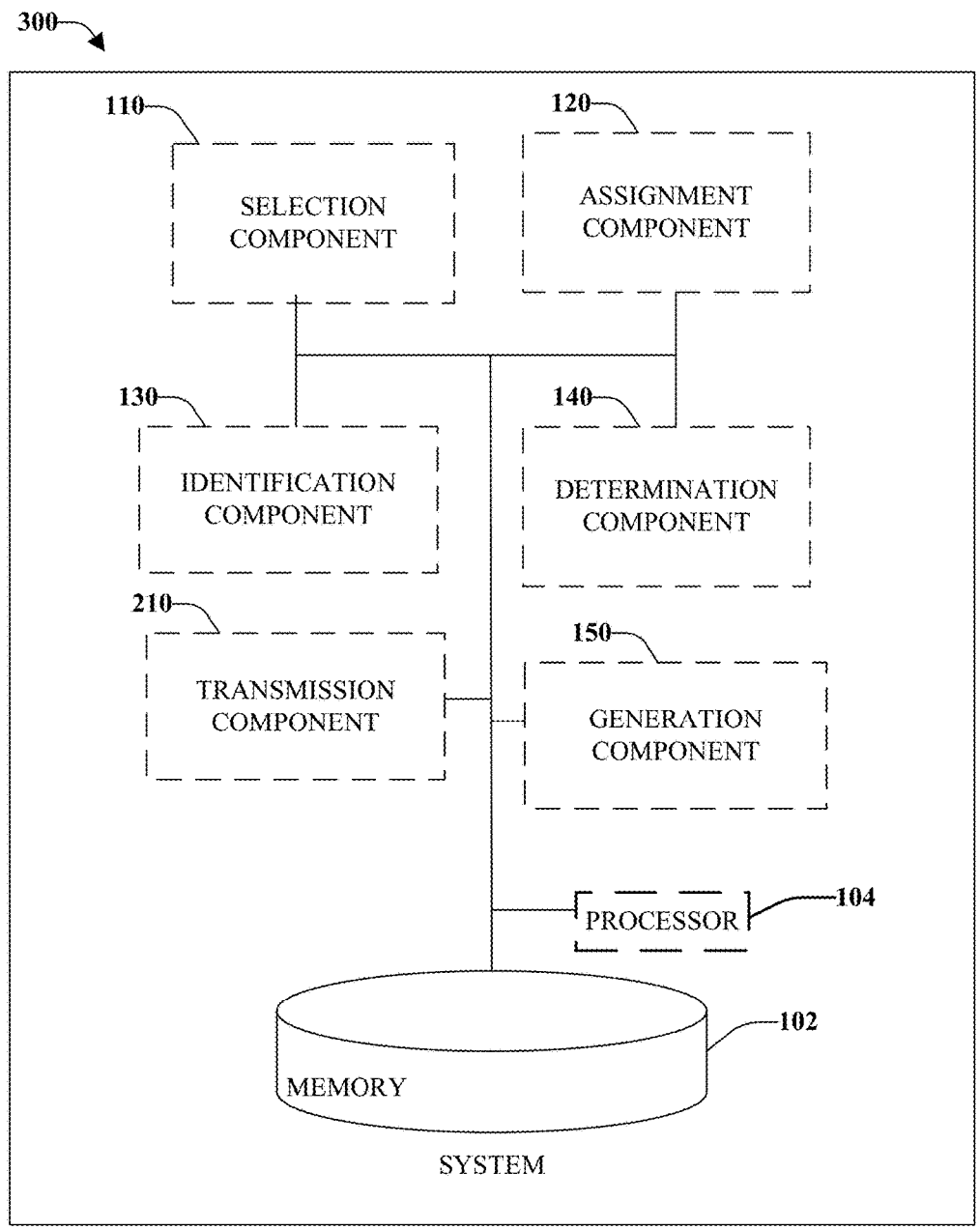
FIG. 3 illustrates a non-limiting example of a system for mitigating signal interference of a full-duplex MIMO communication network.

Turning now to FIG. 3, illustrated is a non-limiting embodiment of system 300 that mitigates an interference signal and maximizes a weighted sum rate of data transmitted via a multi-user MIMO full-duplex network. In an aspect, system 300 comprises a selection component 110, an assignment component 120, an identification component 130, a determination component 140, and a generation component 150. In another aspect, the executable modules of system 300 can further comprise a transmission component 210 that concurrently receives, using the first linear transceiver vector, the set of first data streams from the subset of uplink user devices, and transmits, using the second linear transceiver vector, the second set of data streams to the subset of downlink user devices.

In an aspect, system 300 is a full-duplex system thus facilitating simultaneous transmission and reception within the same frequency band and time slot of data corresponding to outgoing and ingoing data streams respectively. As such, the transmission component 310 can be configured to communicate the first set of data streams and the second set of data streams according to a multiple input multiple output (MIMO) protocol. Furthermore, in an aspect, transceiver component 310 can employ a transceiver at the BS to serve multiple uplink user devices and multiple downlink user devices simultaneously. Accordingly, system 300 can achieve an increase in spectral efficiency and can utilize channels for data transmission efficiently to achieve a higher data rate (e.g., using the WSRM algorithm) as compared to baseline systems that do not implement the WSRM algorithm described herein.

Figure 4:
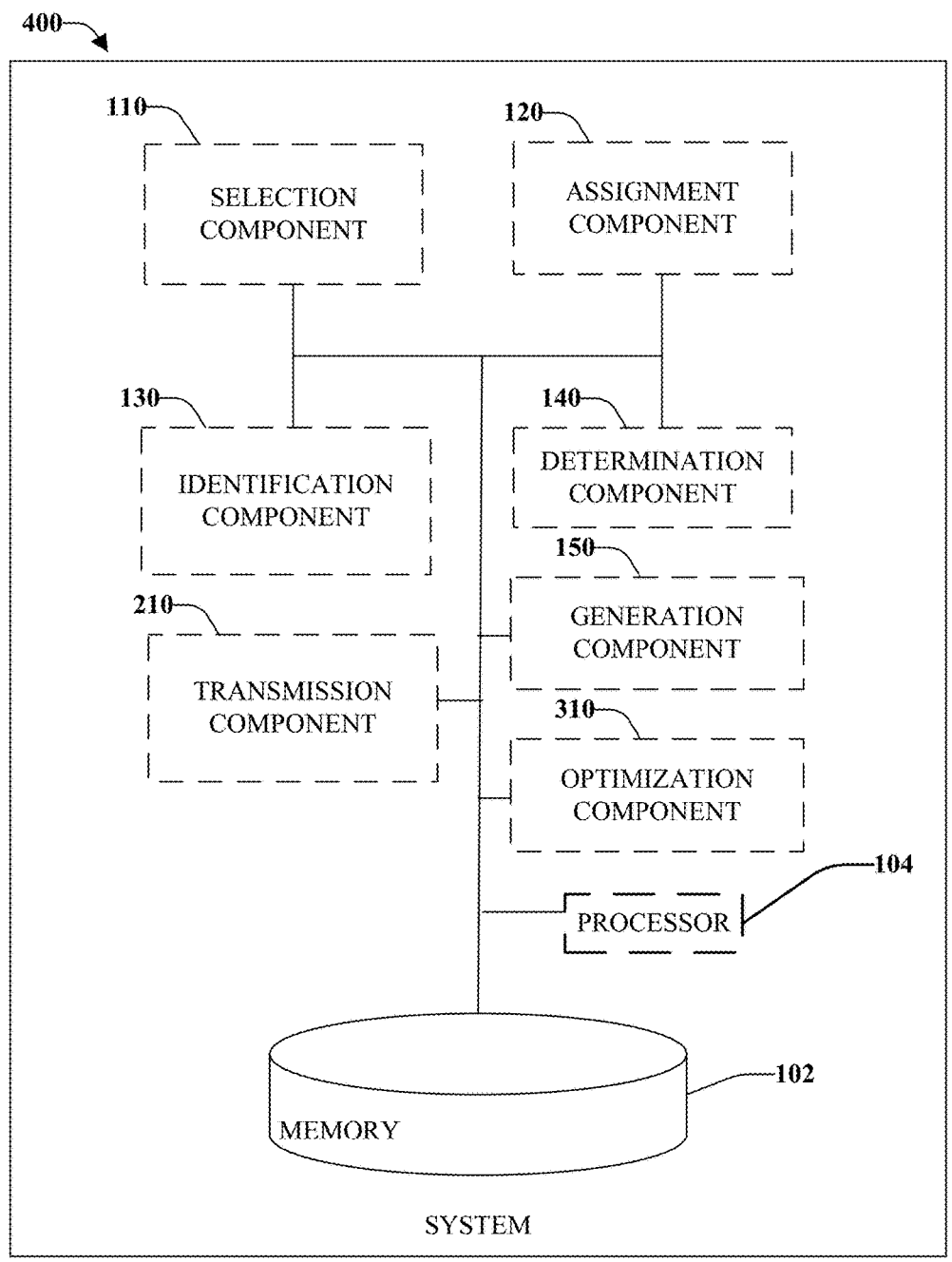
FIG. 4 illustrates a non-limiting example of a system for mitigating signal interference of a full-duplex MIMO communication network.

Turning now to FIG. 4, illustrated is a non-limiting embodiment of system 400 that mitigates an interference signal and maximizes a weighted sum rate of data transmitted via a multi-user MIMO full-duplex network. In an aspect, system 400 comprises a selection component 110, an assignment component 120, an identification component 130, a determination component 140, a generation component 150, and a transceiver component 210. In another aspect, the executable modules of system 400 can further comprise an optimization component 310 that calculates a maximum number of data streams capable of comprising the first set of data streams based on a set of adjustment rules that adjust the number of data streams. As described above, the optimization component 310 can calculate the maximum number of data streams based on transmission rules, such as the algorithm for adjusting uplink data streams and downlink data streams. Furthermore, the optimization component 310 can perform calculations in connection with other components such as assignment component 210, wherein the assignment component can assign data streams to user devices based on a resultant calculation performed by optimization component 310.

Figure 5:
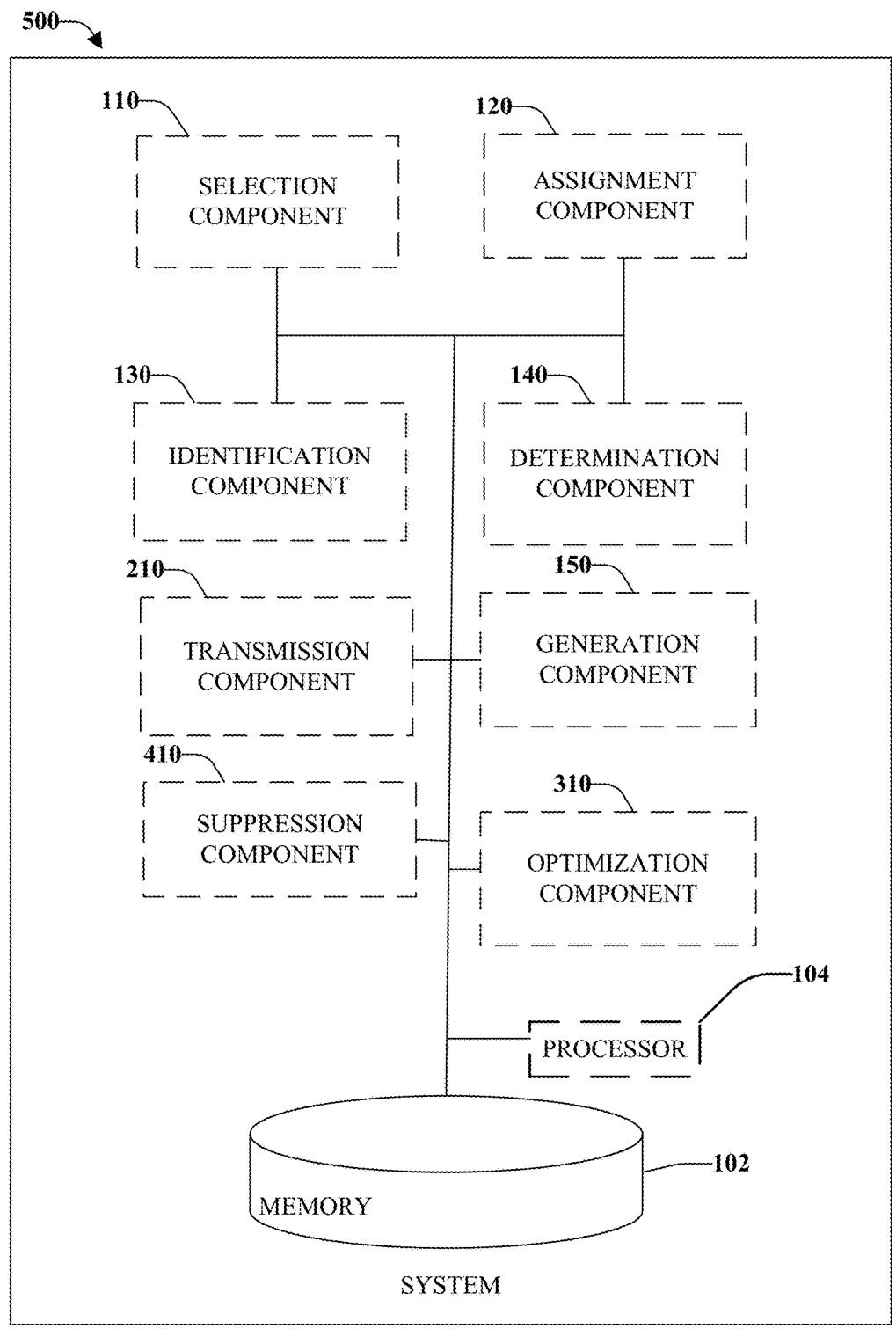
FIG. 5 illustrates a non-limiting example of a system for mitigating signal interference of a full-duplex MIMO communication network.

Turning now to FIG. 5, illustrated is a non-limiting embodiment of system 500 that mitigates an interference signal and maximizes a weighted sum rate of data transmitted via a multi-user MIMO full-duplex network. In an aspect, system 500 comprises a selection component 110, an assignment component 120, an identification component 130, a determination component 140, a generation component 150, a transceiver component 210, and an optimization component 310. In another aspect, the executable modules of system 500 can further comprise a suppression component 410 that mitigates a self-interference signal associated with a system operation and an interference signal between the first set of data streams and the second set of data streams.

In an aspect, suppression component 410 can comprise mitigating interference problems associated with transmitting a signal between base station transmitters (e.g., transceiver) and user device receivers as well as base station receivers (e.g., transceiver) and user device transmitters. Furthermore, in an aspect, suppression component 410 can mitigate interference problems between user devices. For instance, suppression component 410 can mitigate interference of signals between downlink user devices and uplink user devices within a close proximity. In yet another aspect, the suppression component 410 can further increase a signal to noise ratio (SNR) corresponding to the first set of data streams and the second set of data streams by increasing a signal power corresponding to the first set of data streams and the second set of data streams and decreasing a interference power corresponding to the first set of data streams and the second set of data streams.

Figure 6:
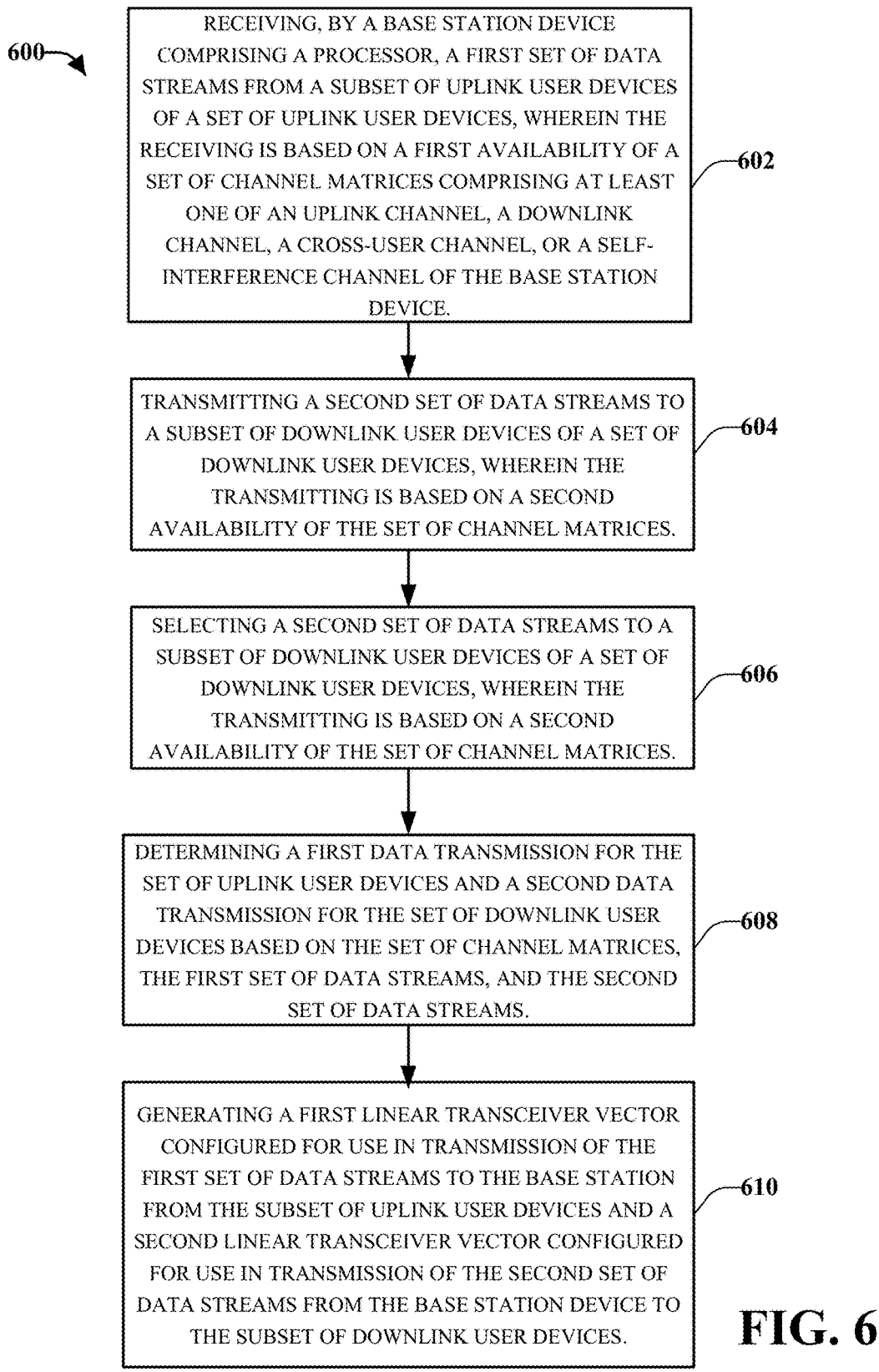
FIG. 6 illustrates a non-limiting example methodology for mitigating signal interference associated with a full-duplex MIMO communication network.
Figure 7:
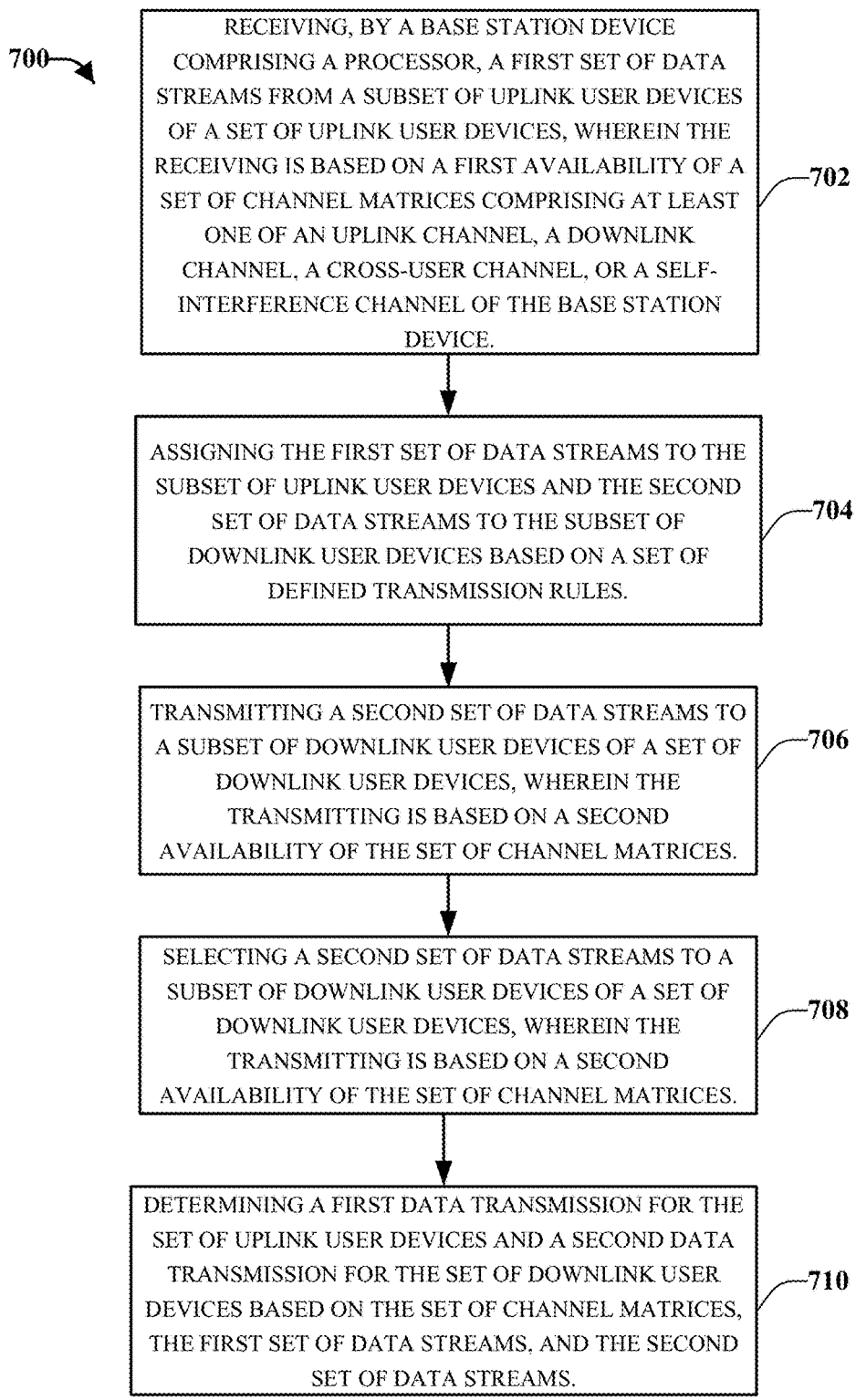
FIG. 7 illustrates a non-limiting example methodology for mitigating signal interference associated with a full-duplex MIMO communication network.
Figure 8:
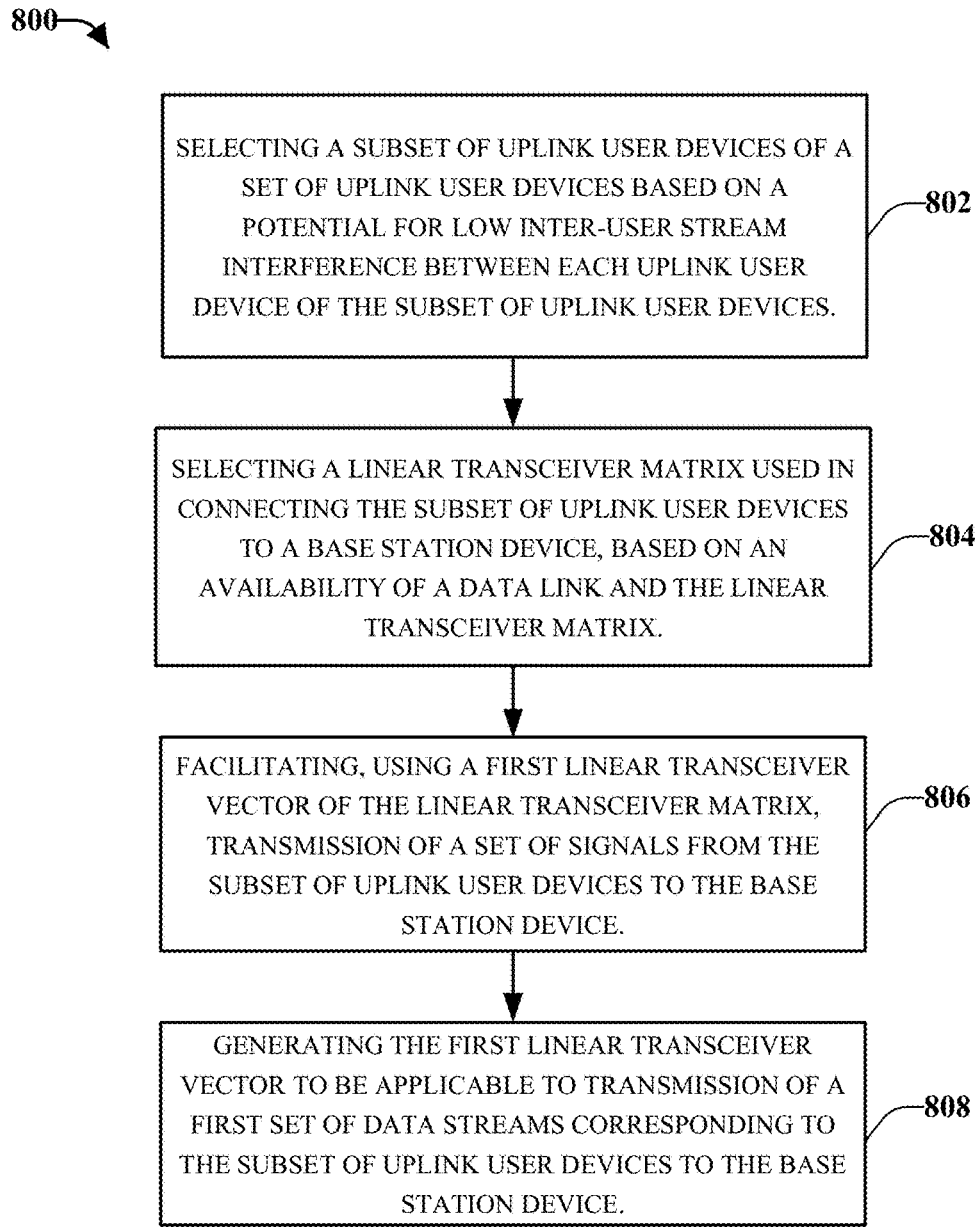
FIG. 8 illustrates an non-limiting example methodology for mitigating signal interference associated with a full-duplex MIMO communication network.

In view of the example systems described herein, example methods that can be implemented in accordance with the disclosed subject matter can be further appreciated with reference to flowcharts in FIGS. 6-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Referring now to FIG. 6, presented is a flow diagram of an example application of systems disclosed in this description in accordance with a non-limiting embodiment. In an aspect, exemplary methodology 600 for mitigating interference associated with a multi-user MIMO communication system is described herein. At 602, a base station device comprising a processor, receives (e.g., using a transmission component 210) a first set of data streams from a subset of uplink user devices of a set of uplink user devices, wherein the receiving is based on a first availability of a set of channel matrices comprising channel information representing at least one of an uplink channel, a downlink channel, a cross-user channel, or a self-interference channel of the base station device, wherein the base station device is configured to communicate according to a multiple input multiple output (MIMO) protocol. At 604, the base station device transmits (e.g., using a transmission component 210) a second set of data streams to a subset of downlink user devices of a set of downlink user devices, wherein the transmitting is based on a second availability of the set of channel matrices.

At 606, the base station device selects (e.g., using selection component 110) a first linear transceiver matrix, based on which the base station device receives a first set of signals from the subset of uplink user devices and a second linear transceiver matrix to transmit a second set of signals from the base station device to the subset of downlink user devices based on a third availability of a data link and the set of channel matrices. At 608, the base station device determines (e.g., using a determination component 140) a first data transmission for the set of uplink user devices and a second data transmission for the set of downlink user devices based on the set of channel matrices, the first set of data streams, and the second set of data streams. At 610, the base station device, generates (e.g., using generation component 150) a first linear transceiver vector configured for use in transmission of the first set of data streams to the base station device from the subset of uplink user devices and a second linear transceiver vector configured for use in transmission of the second set of data streams from the base station device to the subset of downlink user devices.

Referring now to FIG. 7, presented is a flow diagram of an example application of systems disclosed in this description in accordance with a non-limiting embodiment. In an aspect, exemplary methodology 700 for mitigating interference associated with a multi-user MIMO communication system is described herein. At 702, a base station device comprising a processor, receives (e.g., using a transmission component 210) a first set of data streams from a subset of uplink user devices of a set of uplink user devices, wherein the receiving is based on a first availability of a set of channel matrices comprising channel information representing at least one of an uplink channel, a downlink channel, a cross-user channel, or a self-interference channel of the base station device, wherein the base station device is configured to communicate according to a multiple input multiple output (MIMO) protocol. At 704, the base station device assigns (e.g., using assignment component 120) the first set of data streams to the subset of uplink user devices and the second set of data streams to the subset of downlink user devices based on a set of defined transmission rules.

At 706, the base station device transmits (e.g., using a transmission component 210) a second set of data streams to a subset of downlink user devices of a set of downlink user devices, wherein the transmitting is based on a second availability of the set of channel matrices. At 708, the base station device selects (e.g., using selection component 110) a first linear transceiver matrix, based on which the base station device receives a first set of signals from the subset of uplink user devices and a second linear transceiver matrix to transmit a second set of signals from the base station device to the subset of downlink user devices based on a third availability of a data link and the set of channel matrices. At 710, the base station device determines (e.g., using a determination component 140) a first data transmission for the set of uplink user devices and a second data transmission for the set of downlink user devices based on the set of channel matrices, the first set of data streams, and the second set of data streams.

Referring now to FIG. 8, presented is a flow diagram of an example application of systems disclosed in this description in accordance with a non-limiting embodiment. In an aspect, exemplary methodology 800 for mitigating interference associated with a multi-user MIMO communication system is described herein. At 802, a subset of uplink user devices of a set of uplink user devices is selected (e.g., using selection component 110) based on a potential for low inter-user stream interference between each uplink user device of the subset of uplink user devices. At 804, a linear transceiver matrix is selected (e.g., using selection component 110) wherein the linear transceiver matrix is used in connecting the subset of uplink user devices to a base station device, based on an availability of a data link and the linear transceiver matrix. At 806, a first linear transceiver vector of the linear transceiver matrix is used to facilitate transmission (e.g., using transmission component 210) of a set of signals from the subset of uplink user devices to the base station device. At 808, the first linear transceiver vector is generated (e.g., using generation component 150) wherein the first linear transceiver vector is applicable to transmission of a first set of data streams corresponding to the subset of uplink user devices to the base station device.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
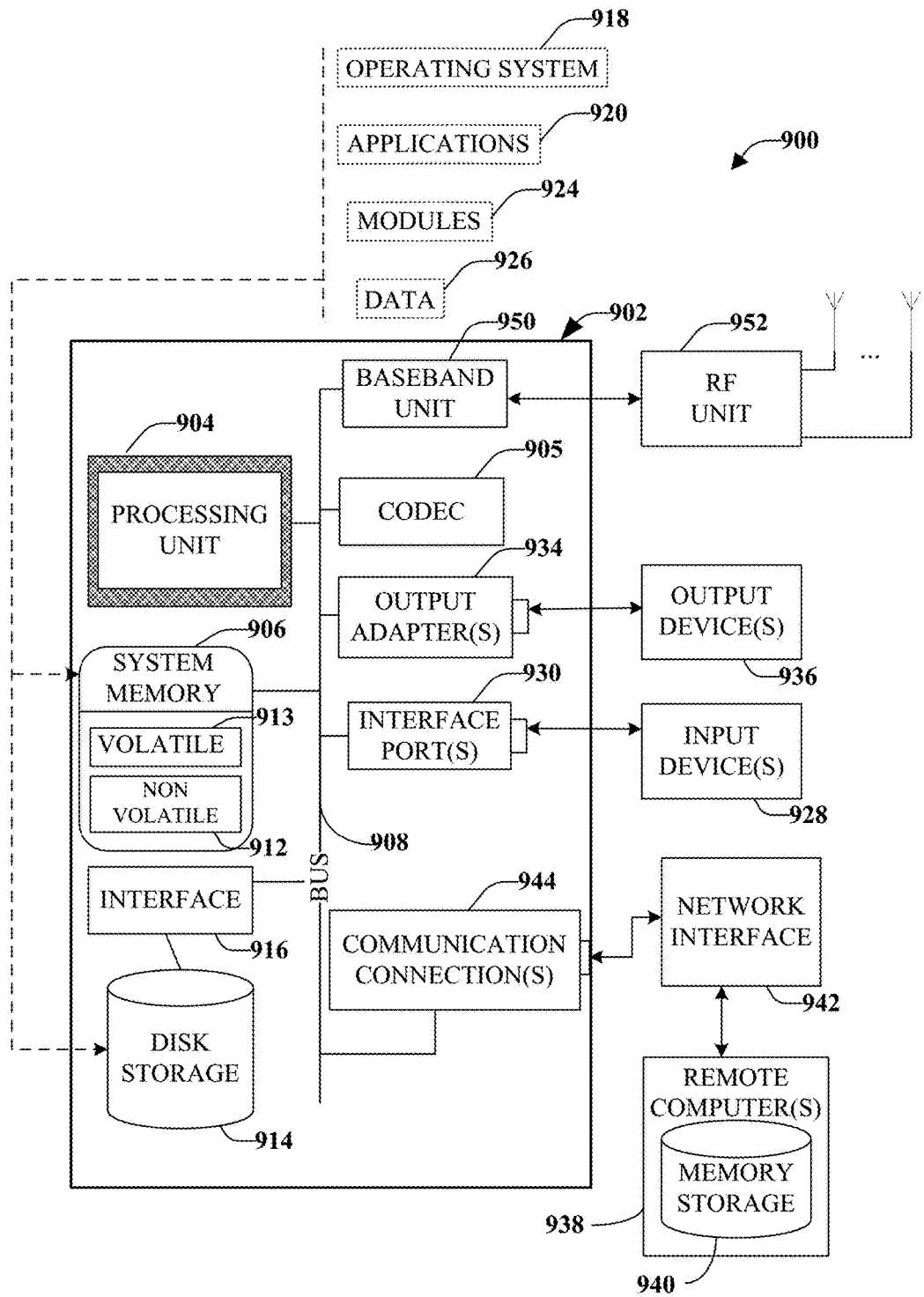
FIG. 9 is a block diagram representing an exemplary non-limiting networked environment in which the various embodiments can be implemented.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to various embodiments, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by the operating system through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Embodiments described in this disclosure can interface with the BASEBAND UNIT 950, which interfaces with the RF UNIT 952. The outgoing signal are processed by the proposed method and passed to the BASEBAND UNIT 950 for transmission. The received signals are passed from the BASEBAND UNIT 950 to a computer implementing the proposed method for processing.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
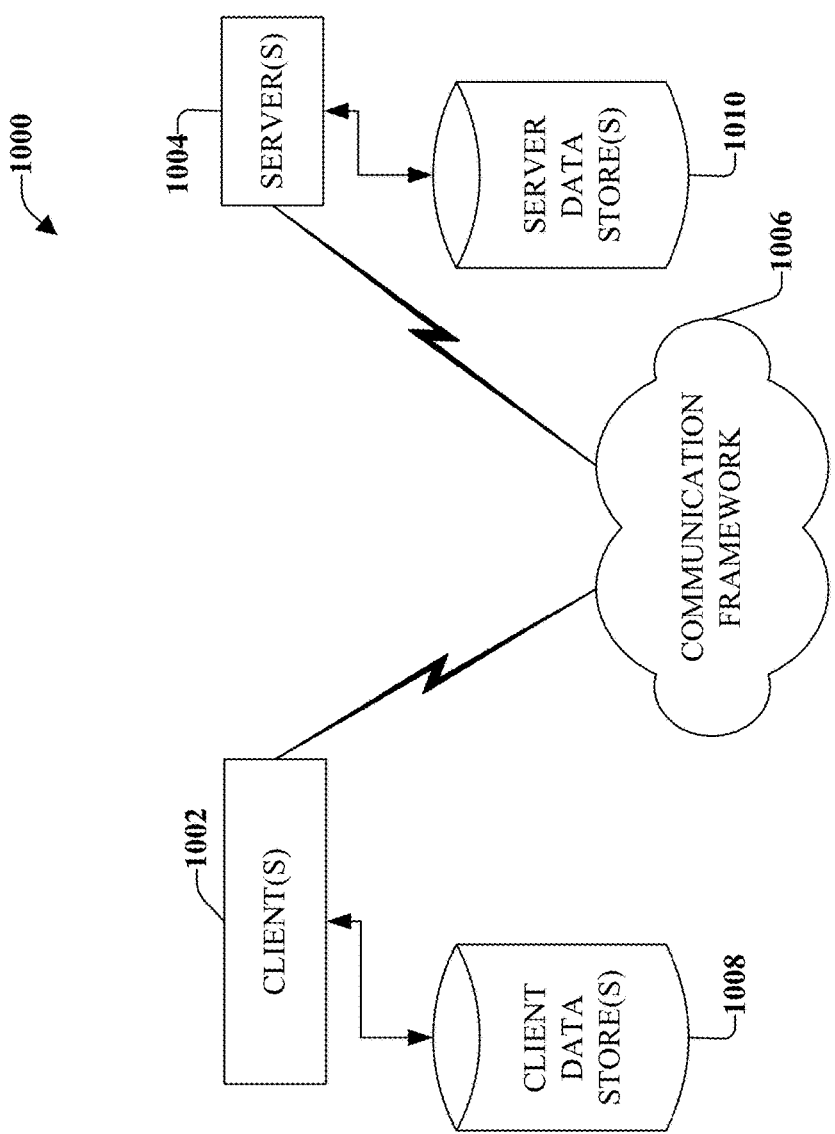
FIG. 10 is a block diagram representing an exemplary non-limiting computing system or operating environment in which the various embodiments may be implemented.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a metadata, such as associated contextual information for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the various embodiments. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the various embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the various embodiments include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the various embodiments may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
a memory that stores executable modules; and
a processor, coupled to the memory, that executes the executable modules to perform operations of the system, the executable modules comprising:
a selection component that selects a subset of uplink user devices of a set of uplink user devices and a subset of downlink user devices of a set of downlink user devices;
an assignment component that assigns a first set of data streams to the subset of uplink user devices and a second set of data streams to the subset of downlink user devices, wherein an assignment of the first set of data streams and the second set of data streams is based on a set of channel matrices comprising channel information representative of a set of uplink channels, a set of downlink channels, a set of cross-user channels, and a set of self-interference channels;
an identification component that identifies a first initial linear transceiver based on a first initial linear transceiver matrix, wherein the first initial linear transceiver is used to receive the first set of data streams from the subset of uplink user devices, and a second initial linear transceiver based on a second initial linear transceiver matrix, wherein the second initial linear transceiver is used to transmit the second set of data streams to the subset of downlink user devices, and wherein identification of the first initial linear transceiver and the second initial linear transceiver is based on a number of data streams that correspond to the first set of data streams, the second set of data streams and the set of channel matrices;
a determination component that determines a transmission scheme that reduces interference between the first set of data streams and the second set of data streams to maximize a weighted sum data rate, wherein the weighted sum data rate corresponds to a potential transmission of data of the first set of data streams and the second set of data streams based on the first initial linear transceiver matrix, the second initial linear transceiver matrix, the number of data streams corresponding to the first set of data streams and the second set of data streams, and the set of channel matrices, wherein the determination component further determines a first definitive linear transceiver and a second definitive linear transceiver, and wherein the first definitive linear transceiver is capable of receiving the first set of data streams using a first definitive linear transceiver vector from the subset of uplink user devices and the second definitive linear transceiver is capable of transmitting the second set of data streams using a second definitive linear transceiver vector to the subset of downlink user devices; and a generation component that generates the first definitive linear transceiver vector configured for use in a first transmission of the first set of data streams to a base station device and the second definitive linear transceiver vector configured for use in a second transmission of the second set of data streams from the base station device to the subset of downlink user devices based on a first definitive linear transceiver matrix representing the first definitive linear transceiver vector, a second definitive linear transceiver matrix representing the second definitive linear transceiver vector, and the set of channel matrices.

2. The system of claim 1, wherein the executable modules further comprise a transmission component that concurrently receives, using the first definitive linear transceiver vector, the first set of data streams from the subset of uplink user devices, and transmits, using the second definitive linear transceiver vector, the second set of data streams to the subset of downlink user devices.

3. The system of claim 2, wherein the transmission component is configured to communicate the first set of data streams and the second set of data streams according to a multiple input multiple output (MIMO) protocol.

4. The system of claim 1, wherein the assignment component further assigns the first set of data streams to the subset of uplink user devices and the second set of data streams to the subset of downlink user devices based on a defined set of transmission rules.

5. The system of claim 4, wherein the executable modules further comprise an optimization component that calculates the number of data streams capable of comprising the first set of data streams based on a set of adjustment rules that adjust the number of data streams.

6. The system of claim 1, wherein the executable modules further comprise a suppression component that mitigates a self-interference signal associated with a system operation and an interference signal between the first set of data streams and the second set of data streams.

7. The system of claim 6, wherein the suppression component further increases a signal to noise ratio (SNR) corresponding to the first set of data streams and the second set of data streams by increasing a signal power corresponding to the first set of data streams and the second set of data streams and decreasing an interference power corresponding to the first set of data streams and the second set of data streams.

8. The system of claim 1, wherein the selection component selects the subset of uplink user devices and the subset of downlink user devices based on a potential for low inter-user stream interference, low uplink and downlink signal interference, no self-interference, and high channel gain.

9. A computer readable storage device comprising executable instructions that, in response to execution, cause a system comprising a processor to perform operations, comprising:
selecting a subset of uplink user devices of a set of uplink user devices based on a potential for low inter-user stream interference between uplink user devices of the subset of uplink user devices;
selecting a linear transceiver matrix used in connecting the subset of uplink user devices to a base station device, based on an availability of a data link and a full-duplex signal transmission criterion that inhibits interference between a set of data streams associated with the subset of uplink user devices and a set of downlink user devices, wherein the full-duplex signal transmission criterion defines whether the subset of uplink user devices generate a data transmission rate satisfying a target data transmission rate in connection with the set of downlink user devices configured for connection to the base station device;
determining a group of data streams of the set of data streams for transmission based on a number of data streams that correspond to the set of data streams and a set of channel matrices;
based on the full-duplex signal transmission criterion associated with transmission of the group of data streams of the set of data streams, generating a first linear transceiver vector corresponding to the subset of uplink user devices to the base station device and the set of downlink user devices from the base station device; and
facilitating, using the first linear transceiver vector of the linear transceiver matrix, transmission of the group of data streams from the subset of uplink user devices to the base station device based on the full-duplex signal transmission criterion.

10. The computer readable storage device of claim 9, wherein the transmission of the group of data streams occurs in accordance with a multiple input multiple output protocol.

11. The computer readable storage device of claim 10, wherein the operations further comprise mitigating an interference signal between the set of data streams associated with the subset of uplink user devices and the set of downlink user devices.

12. A method, comprising:
selecting, by a system comprising a processor, a subset of uplink user devices of a set of uplink user devices and a subset of downlink user devices of a set of downlink user devices;
assigning, by the system, a first set of data streams to the subset of uplink user devices and a second set of data streams to the subset of downlink user devices, wherein an assignment of the first set of data streams and the second set of data streams is based on a set of channel matrices comprising channel information representative of a set of uplink channels, a set of downlink channels, a set of cross-user channels, and a set of self-interference channels;
identifying, by the system, a first initial linear transceiver based on a first initial linear transceiver matrix, wherein the first initial linear transceiver is used to receive the first set of data streams from the subset of uplink user devices, and a second initial linear transceiver based on a second initial linear transceiver matrix, wherein the second initial linear transceiver is used to transmit the second set of data streams to the subset of downlink user devices, and wherein identification of the first initial linear transceiver and the second initial linear transceiver is based on a number of data streams that correspond to the first set of data streams, the second set of data streams and the set of channel matrices;
determining, by the system, a transmission scheme that reduces interference between the first set of data streams and the second set of data streams to maximize a weighted sum data rate, wherein the weighted sum data rate corresponds to a potential transmission of data of the first set of data streams and the second set of data streams based on the first initial linear transceiver matrix, the second initial linear transceiver matrix, the number of data streams corresponding to the first set of data streams and the second set of data streams, and the set of channel matrices, wherein the determining the transmission scheme comprises determining a first definitive linear transceiver and a second definitive linear transceiver, and wherein the first definitive linear transceiver is capable of receiving the first set of data streams using a first definitive linear transceiver vector from the subset of uplink user devices and the second definitive linear transceiver is capable of transmitting the second set of data streams using a second definitive linear transceiver vector to the subset of downlink user devices; and generating, by the system, the first definitive linear transceiver vector for use in a first transmission of the first set of data streams to a base station device and the second definitive linear transceiver vector for use in a second transmission of the second set of data streams from the base station device to the subset of downlink user devices based on a first definitive linear transceiver matrix representing the first definitive linear transceiver vector, a second definitive linear transceiver matrix representing the second definitive linear transceiver vector, and the set of channel matrices.

13. The method of claim 12, further comprising concurrently receiving, by the system and using the first definitive linear transceiver vector, the first set of data streams from the subset of uplink user devices, and transmitting, by the system and using the second definitive linear transceiver vector, the second set of data streams to the subset of downlink user devices.

14. The method of claim 13, further comprising communicating, by the system, the first set of data streams and the second set of data streams according to a multiple input multiple output (MIMO) protocol.

15. The method of claim 12, further comprising assigning, by the system, the first set of data streams to the subset of uplink user devices and the second set of data streams to the subset of downlink user devices based on a defined set of transmission rules.

16. The method of claim 15, further comprising calculating, by the system, the number of data streams capable of comprising the first set of data streams based on a set of adjustment rules that adjust the number of data streams.

17. The method of claim 12, further comprising mitigating, by the system, a self-interference signal associated with a system operation and an interference signal between the first set of data streams and the second set of data streams.

18. The method of claim 17, further comprising increasing, by the system, a signal to noise ratio corresponding to the first set of data streams and the second set of data streams by increasing a signal power corresponding to the first set of data streams and the second set of data streams and decreasing an interference power corresponding to the first set of data streams and the second set of data streams.

19. The method of claim 12, further comprising selecting, by the system, the subset of uplink user devices and the subset of downlink user devices based on a determined potential for less than a defined inter-user stream interference, less than a defined uplink and downlink signal interference, no or substantially no self-interference, and more than a defined channel gain.

20. The method of claim 12, further comprising defining, by the system, whether the subset of uplink user devices generate a data transmission rate satisfying a target data transmission rate in connection with a group of the set of downlink user devices that are able to connect to the base station device.

* * * * *